US012400674B2

(12) United States Patent
Wang et al.

(10) Patent No.: US 12,400,674 B2
(45) Date of Patent: Aug. 26, 2025

(54) AUDIO SIGNAL ENHANCEMENT METHOD AND APPARATUS, COMPUTER DEVICE, STORAGE MEDIUM AND COMPUTER PROGRAM PRODUCT

(71) Applicant: TENCENT TECHNOLOGY (SHENZHEN) COMPANY LIMITED, Shenzhen (CN)

(72) Inventors: Meng Wang, Shenzhen (CN); Qingbo Huang, Shenzhen (CN); Wei Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 290 days.

(21) Appl. No.: 18/076,116

(22) Filed: Dec. 6, 2022

(65) Prior Publication Data

US 2023/0099343 A1 Mar. 30, 2023

Related U.S. Application Data

(63) Continuation of application No. PCT/CN2022/086960, filed on Apr. 15, 2022.

(30) Foreign Application Priority Data

Apr. 30, 2021 (CN) ......................... 202110484196.6

(51) Int. Cl.
*G10L 21/0232* (2013.01)
*G10L 19/04* (2013.01)
*G10L 25/24* (2013.01)

(52) U.S. Cl.
CPC .......... *G10L 21/0232* (2013.01); *G10L 19/04* (2013.01); *G10L 25/24* (2013.01)

(58) Field of Classification Search
CPC ..... G10L 21/0232; G10L 19/04; G10L 25/24; G10L 21/0364; G10L 21/02;
(Continued)

(56) References Cited

U.S. PATENT DOCUMENTS 5,673,364 A * 9/1997 Bialik ..................... G10L 19/10 704/500
2008/0235011 A1 * 9/2008 Archibald ............... G10L 25/78 704/E21.001
(Continued)

FOREIGN PATENT DOCUMENTS

CN 103714820 A 4/2014
CN 105765651 A 7/2016
(Continued)

OTHER PUBLICATIONS

The World Intellectual Property Organization (WIPO) International Search Report for PCT/CN2022/086960 Jul. 12, 2022 8 Pages (including translation).
(Continued)

*Primary Examiner* — Darioush Agahi
(74) *Attorney, Agent, or Firm* — ANOVA LAW GROUP PLLC

(57) ABSTRACT

This application relates to an audio signal enhancement method, performed by a computer device. The method including decoding received speech packets sequentially to obtain a residual signal, long term filtering parameters and linear filtering parameters; filtering the residual signal to obtain an audio signal; extracting feature parameters from the audio signal, when the audio signal is a feedforward error correction frame signal; converting the audio signal into a filter speech excitation signal based on the linear filtering parameters; performing speech enhancement on the filter speech excitation signal according to the feature parameters, the long term filtering parameters and the linear
(Continued)

filtering parameters to obtain an enhanced speech excitation signal; and performing speech synthesis to obtain an enhanced speech signal based on the enhanced speech excitation signal and the linear filtering parameters.

19 Claims, 8 Drawing Sheets

(58) Field of Classification Search
CPC ....... G10L 19/005; G10L 19/08; G10L 19/09; G10L 19/26; G10L 25/90; G10L 2019/0011
See application file for complete search history.

(56) References Cited

U.S. PATENT DOCUMENTS

| | | | |
|---|---|---|---|
| 2010/0174538 A1 | 7/2010 | Vos | |
| 2012/0253797 A1* | 10/2012 | Geiger | G10L 19/083 704/219 |
| 2016/0240203 A1 | 8/2016 | Lecomte | |
| 2016/0379650 A1 | 12/2016 | Lecomte et al. | |
| 2017/0287493 A1 | 10/2017 | Liu et al. | |
| 2018/0114533 A1* | 4/2018 | Lecomte | G10L 19/09 |
| 2018/0204580 A1 | 7/2018 | Fischer et al. | |
| 2019/0244622 A1* | 8/2019 | Borkar | G10L 17/16 |
| 2020/0273493 A1* | 8/2020 | Huber | G11B 27/34 |
| 2021/0074308 A1* | 3/2021 | Skordilis | G06N 3/084 |
| 2022/0059099 A1* | 2/2022 | Norvell | G10L 19/02 |

FOREIGN PATENT DOCUMENTS

| | | | |
|---|---|---|---|
| CN | 107248411 | A | 10/2017 |
| CN | 111554323 | A | 8/2020 |
| CN | 111554380 | A | 8/2020 |
| CN | 112489665 | A | 3/2021 |
| CN | 113763973 | A | 12/2021 |
| JP | 2016535867 | A | 11/2016 |
| JP | 2018528480 | A | 9/2018 |
| WO | 2021050155 | A1 | 3/2021 |

OTHER PUBLICATIONS

The Japan Patent Office (JPO) Notification of Reasons for Refusal for Application No. 2023-535590 and Translation Jun. 10, 2024 6 Pages.

* cited by examiner

AUDIO SIGNAL ENHANCEMENT METHOD AND APPARATUS, COMPUTER DEVICE, STORAGE MEDIUM AND COMPUTER PROGRAM PRODUCT

RELATED APPLICATIONS

This application is a continuation of PCT Application No. PCT/CN2022/086960, filed on Apr. 15, 2022, which claims priority to Chinese Patent Application No. 2021104841966, filed with the Chinese Patent Office on Apr. 30, 2021 and entitled "AUDIO SIGNAL ENHANCEMENT METHOD AND APPARATUS, COMPUTER DEVICE, AND STORAGE MEDIUM." The two applications are both incorporated herein by reference in their entirety.

FIELD OF THE TECHNOLOGY

This application relates to the field of computer technologies, and in particular, to an audio signal enhancement method and apparatus, a computer device, a storage medium and a computer program product.

BACKGROUND OF THE DISCLOSURE

In the process of encoding and decoding audio signals, quantization noise often occurs, which causes distortion of the speech synthesized by decoding. In the traditional solution, pitch filter or post-processing technology based on neural networks is usually used to enhance audio signals, to reduce the influence of quantization noise on speech quality.

It is therefore important to improve signal processing speed, reduce latency, and improve quality of speech enhancement.

SUMMARY

According to embodiments of this application, an audio signal enhancement method and apparatus, a computer device, a storage medium and a computer program product are provided.

One aspect of the present application provides an audio signal enhancement method, performed by a computer device. The method includes decoding received speech packets sequentially to obtain a residual signal, long term filtering parameters and linear filtering parameters; filtering the residual signal to obtain an audio signal; extracting feature parameters from the audio signal, when the audio signal is a feedforward error correction frame signal; converting the audio signal into a filter speech excitation signal based on the linear filtering parameters; performing speech enhancement on the filter speech excitation signal according to the feature parameters, the long term filtering parameters and the linear filtering parameters to obtain an enhanced speech excitation signal; and performing speech synthesis to obtain an enhanced speech signal based on the enhanced speech excitation signal and the linear filtering parameters.

A computer device, including a memory and a processor, the memory storing a computer program, the processor, when executing the computer program, implementing the following steps: decoding received speech packets sequentially to obtain a residual signal, long term filtering parameters and linear filtering parameters; filtering the residual signal to obtain an audio signal; extracting feature parameters from the audio signal, when the audio signal is a feedforward error correction frame signal; converting the audio signal into a filter speech excitation signal based on the linear filtering parameters; performing speech enhancement on the filter speech excitation signal according to the feature parameters, the long term filtering parameters and the linear filtering parameters to obtain an enhanced speech excitation signal; and performing speech synthesis to obtain an enhanced speech signal based on the enhanced speech excitation signal and the linear filtering parameters.

A non-transitory computer-readable storage medium is provided, storing a computer program, the computer program, when executed by a processor, implementing the following steps: decoding received speech packets sequentially to obtain a residual signal, long term filtering parameters and linear filtering parameters; filtering the residual signal to obtain an audio signal; extracting feature parameters from the audio signal, when the audio signal is a feedforward error correction frame signal; converting the audio signal into a filter speech excitation signal based on the linear filtering parameters; performing speech enhancement on the filter speech excitation signal according to the feature parameters, the long term filtering parameters and the linear filtering parameters to obtain an enhanced speech excitation signal; and performing speech synthesis to obtain an enhanced speech signal based on the enhanced speech excitation signal and the linear filtering parameters.

Details of one or more embodiments of this application are provided in the accompanying drawings and descriptions below. Other features and advantages of this application are illustrated in the specification, the accompanying drawings, and the claims.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the appended drawings.

DESCRIPTION OF EMBODIMENTS

To make objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

Figure 1:
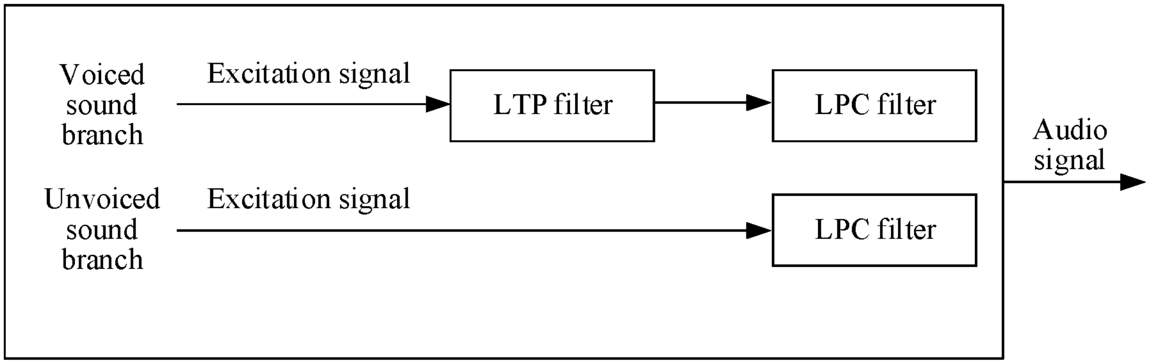
FIG. 1 is a schematic diagram of a speech generation model based on excitation signals according to one embodiment.

Before describing an audio signal enhancement method provided in this application, a speech generation model will be described first. Referring to a speech generation model based on excitation signals shown in FIG. 1, the physical theoretical basis of the speech generation model based on excitation signals is the generation process of human voice, which includes:

(1) At the trachea, a noise-like impact signal with a certain energy is generated, which corresponds to the excitation signal in the speech generation model based on excitation signals.

(2) The impact signal impacts the vocal cords of humans to make the vocal cords produce quasi-periodic opening and closing, which is amplified by the oral cavity to produce sound. This sound corresponds to filters in the speech generation model based on excitation signals.

In this process, considering the characteristics of sound, the filters in the speech generation model based on excitation signals are divided into long term prediction (LTP) filters and linear predictive coding (LPC) filters. The LTP filter enhances the audio signal based on long term correlations of speech, and the LPC filter enhances the audio signal based on short term correlations. Specifically, for quasi-periodic signals such as voiced sound, in the speech generation model based on excitation signals, the excitation signals respectively impact the LTP filter and the LPC filter. For aperiodic signals such as unvoiced sound, the excitation signal will only impact the LPC filter.

The solutions provided in the embodiments of this application relate technologies such as ML of AI, and are specifically described by using the following embodiments. The audio signal enhancement method provided by this application is performed by a computer device, and can be specifically applied to an application environment shown in FIG. 2. A terminal 202 communicates with a server 204 through a network. The terminal 202 may receive speech packets transmitted by the server 204 or speech packets forwarded by other devices via the server 204. The server 204 may receive speech packets transmitted by the terminal or speech packets transmitted by other devices. The above audio signal enhancement method may be applied to the terminal 202 or the server 204. In the example of application to the terminal 202, the terminal 202 decodes received speech packets sequentially to obtain a residual signal, long term filtering parameters and linear filtering parameters, and filters the residual signal to obtain an audio signal; extracts, when the audio signal is a feedforward error correction frame signal, feature parameters from the audio signal; converts the audio signal into a filter speech excitation signal based on the linear filtering parameters; performs speech enhancement on the filter speech excitation signal according to the feature parameters, the long term filtering parameters and the linear filtering parameters to obtain an enhanced speech excitation signal; and performs speech synthesis based on the enhanced speech excitation signal and the linear filtering parameters to obtain an enhanced speech signal.

The terminal 202 may, but is not limited to, various personal computers, laptops, smartphones, tablets and portable wearable devices. The server 204 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

Figure 2:
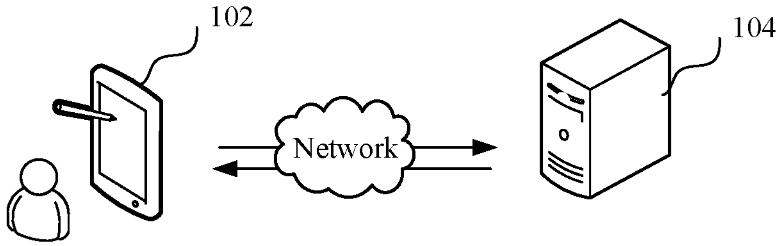
FIG. 2 is an application environment diagram of an audio signal enhancement method according to one embodiment.
Figure 3:
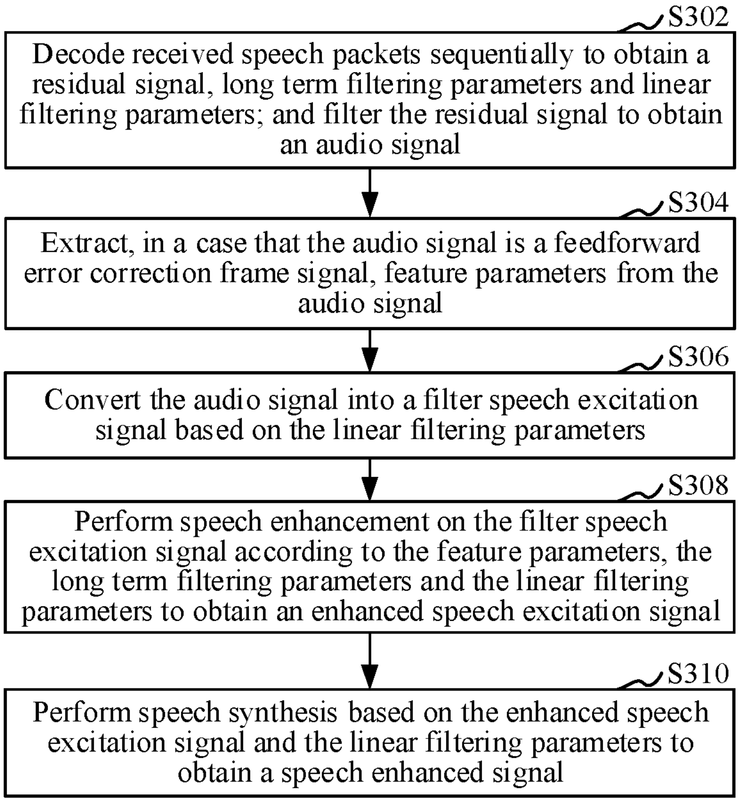
FIG. 3 is a flowchart of an audio signal enhancement method according to one embodiment.

In an embodiment, as shown in FIG. 3, an audio signal enhancement method is provided. The method is applied to the computer device (terminal or server) shown in FIG. 2 is used as an example for description. The method includes the following step:

S302: Decode received speech packets sequentially to obtain a residual signal, long term filtering parameters and linear filtering parameters; and filter the residual signal to obtain an audio signal.

The received speech packets may be speech packets in an anti-packet loss scenario based on feedforward error correction (FEC).

Feedforward error correction is an error control technique. Before a signal is sent to the transmission channel, it is encoded in advance according to a certain algorithm to add redundant codes with the characteristics of the signal, and the received signal is decoded according to the corresponding algorithm at the receiving end to find out the error code generated in the transmission process and correct it.

Figure 4:
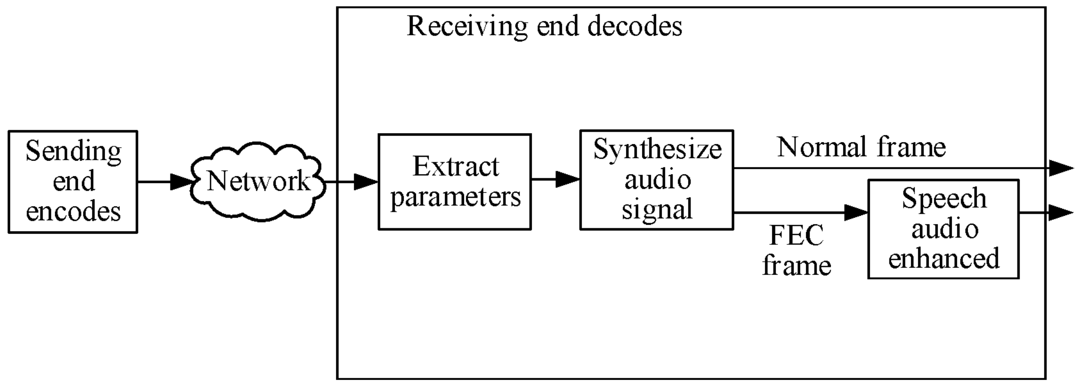
FIG. 4 is a flowchart showing audio signal transmission according to one embodiment.

Redundant codes may also be called redundant information. In the embodiment of this application, with reference to FIG. 4, when a signal sending end encodes a current speech frame (current frame for short) audio signal, audio signal information of a previous speech frame (previous frame for short) may be encoded into a speech packet corresponding to the current frame audio signal as redundant information, and after the completion of the encoding, the speech packet corresponding to the current frame audio signal is sent to the receiving end, such that the receiving end receives the speech packet. Accordingly, even if a failure occurs in the signal transmission process, which makes the receiving end fail in receiving a certain speech packet or a certain voice packet have error codes, the audio signal corresponding to the lost speech packet or the speech packet with error codes can also be obtained by decoding the speech packet corresponding to the next speech frame (next frame for short) audio signal, thereby improving the signal transmission reliability. The receiving end may be the terminal 202 in FIG. 2.

Specifically, when receiving the speech packet, the terminal stores the received speech packet in a cache, fetches the speech packet corresponding to the speech frame to be played from the cache, and decodes and filters the speech packet to obtain the audio signal. When the speech packet is a packet adjacent to the historical speech packet decoded at the previous moment and the historical speech packet decoded at the previous moment has no anomalies, the obtained audio signal is directly outputted, or the audio signal is enhanced to obtain an enhanced speech signal and the enhanced speech signal is outputted. When the speech packet is not the packet adjacent to the historical speech packet decoded at the previous moment, or when the speech packet is the packet adjacent to the historical speech packet decoded at the previous moment but the historical speech packet decoded at the previous moment has anomalies, the audio signal is enhanced to obtain an enhanced speech signal and the enhanced speech signal is outputted. The enhanced speech signal carries the audio signal corresponding to the packet adjacent to the historical speech packet decoded at the previous moment.

The decoding may specifically be entropy decoding, which is a decoding solution corresponding to entropy encoding. Specifically, when the sending end encodes the audio signal, the audio signal may be encoded by the entropy encoding solution to obtain a speech packet. Thereby, when the receiving end receives the speech packet, the speech packet may be decoded by the entropy encoding solution.

In one embodiment, when receiving the speech packet, the terminal decodes the received speech packet to obtain a residual signal and filter parameters, and performs signal synthesis filtering on the residual signal based on the filter parameters to obtain the audio signal. The filter parameters include long term filtering parameters and linear filtering parameters.

Specifically, when encoding the current frame audio signal, the sending end analyzes the previous frame audio signal to obtain filter parameters, configure parameters of the filters based on the obtained filter parameters, performs analysis filtering on the current frame audio signal through the configured filters to obtain a residual signal of the current frame audio signal, encodes the audio signal by using the residual signal and the filter parameters obtained by analysis to obtain a speech packet, and sends the speech packet to the receiving end. Thereby, after receiving the speech packet, the receiving end decodes the received speech packet to obtain the residual signal and the filter parameters, and performs signal synthesis filtering on the residual signal based on the filter parameters to obtain the audio signal.

In one embodiment, the filter parameters include a linear filtering parameter and a long term filtering parameter. When encoding the current frame audio signal, the sending end analyzes the previous frame audio signal to obtain linear filtering parameters and long term filtering parameters, performs linear analysis filtering on the current frame audio signal based on the linear filtering parameters to obtain a linear filtering excitation signal, then performs long term analysis filtering on the linear filtering excitation signal based on the long term filtering parameters to obtain the residual signal corresponding to the current frame audio signal, encodes the current frame audio signal based on the residual signal and the linear filtering parameters and long term filtering parameters obtained by analysis to obtain a speech packet, and sends the speech packet to the receiving end.

Specifically, the performing the linear analysis filtering on the current frame audio signal based on the linear filtering parameters specifically includes: configuring parameters of linear predictive coding filters based on the linear filtering parameters, and performing linear analysis filtering on the audio signal by the parameter-configured linear predictive coding filters to obtain a linear filtering excitation signal. The linear filtering parameters include a linear filtering coefficient and an energy gain value. The linear filtering coefficient may be denoted as LPC AR, and the energy gain value may be denoted as LPC gain. The formula of the linear predictive coding filter is as follows:

$$e(n) = s(n) + \sum_{i=1}^{p} a_i s_{adj}(n-i) \tag{1}$$

e(n) is the linear filtering excitation signal corresponding to the current frame audio signal, s(n) is the current frame audio signal, p is the number of sampling points included in each frame audio signal, $a_i$ is the linear filtering coefficient obtained by analyzing the previous frame audio signal, and $s_{adj}(n-i)$ is the energy-adjusted state of the previous frame audio signal s(n−i) of the current frame audio signal s(n). $s_{adj}(n-i)$ may be obtained by the following formula:

$$s_{adj}(n-i) = \text{gain}_{adj} g s(n-i) \tag{2}$$

s(n−i) is the previous frame audio signal of the current frame audio signal s(n), and $\text{gain}_{adj}$ is the energy adjustment parameter of the previous frame audio signal s(n−i). $\text{gain}_{adj}$ may be obtained by the following formula:

$$\text{gain}_{adj} = \frac{\text{gain}(n-i)}{\text{gain}(n)} \tag{3}$$

gain(n) is the energy gain value corresponding to the current frame audio signal, and gain(n−i) is the energy gain value corresponding to the previous frame audio signal.

The performing the long term analysis filtering on the linear filtering excitation signal based on the long term filtering parameters specifically includes: configuring parameters of the long term prediction filter based on the long term filtering parameters, and performing long term analysis filtering on the residual signal by the parameter-configured long term prediction filter to obtain a residual signal corresponding to the current frame audio signal. The long term filtering parameters include a pitch period and a corresponding magnitude gain value. The pitch period may be denoted as LTP pitch, and the corresponding magnitude gain value may be denoted as LTP gain. The frequency domain of the long term prediction filter is expressed as follows, where the frequency domain can be denoted as Z domain:

$$p(z) = 1 - \gamma z^{-T} \tag{4}$$

Figure 5:
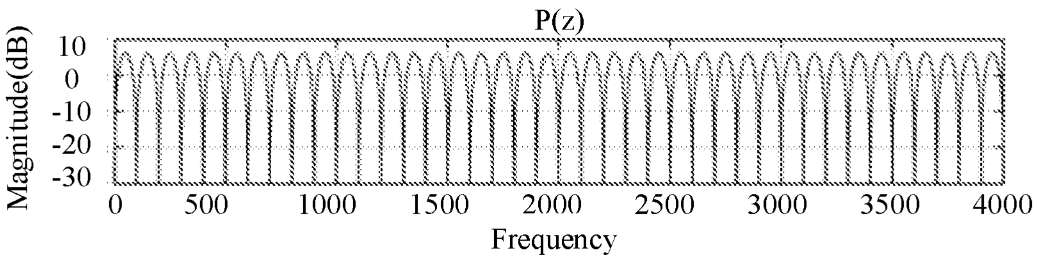
FIG. 5 is a magnitude-frequency response diagram of a long term prediction filter according to one embodiment.

In the formula above, p(z) is the magnitude-frequency response of the long term prediction filter, z is the twiddle factor of frequency domain transformation, $\gamma$ is the magnitude gain value LTP gain, and T is the pitch period LTP pitch. FIG. 5 shows a magnitude-frequency response diagram of a long term prediction filter when $\gamma=1$ and T=80 according to one embodiment.

The time domain of the long term prediction filter is expressed as follows:

$$\delta(n) = e(n) - \gamma e(n-T) \tag{5}$$

$\delta(n)$ is the residual signal corresponding to the current frame audio signal, e(n) is the linear filtering excitation signal corresponding to the current frame audio signal, $\gamma$ is the magnitude gain value LTP gain, T is the pitch period LTP pitch, and e(n−T) is the linear filtering excitation signal corresponding to the audio signal of the previous pitch period of the current frame audio signal.

In one embodiment, the filter parameters decoded by the terminal includes long term filtering parameters and linear filtering parameters, and the signal synthesis filtering includes long term synthesis filtering based on the long term filtering parameters and linear synthesis filtering based on the linear filtering parameters. After decoding the speech packet to obtain the residual signal, the long term filtering parameters and the linear filtering parameters, the terminal performs long term synthesis filtering on the residual signal based on the long term filtering parameters to obtain the long term filtering excitation signal, and then performs linear synthesis filtering on the long term filtering excitation signal based on the linear filtering parameters to obtain the audio signal.

In one embodiment, after obtaining the residual signal, the terminal splits the obtained residual signal into a plurality of subframes to obtain a plurality of sub-residual signals, performs long term synthesis filtering respectively on each sub-residual signal based on the corresponding long term filtering parameters to obtain a long term filtering excitation signal corresponding to each subframe, and then combines the long term filtering excitation signals corresponding to the subframes each in a chronological order of the subframes to obtain the corresponding long term filtering excitation signal.

For example, when a speech packet corresponds to a 20 ms audio signal, that is, the obtained residual signal has a frame length of 20 ms, the residual signal may be split into 4 subframes to obtain four 5 ms sub-residual signals, long term synthesis filtering may be performed on each 5 ms sub-residual signal respectively based on the corresponding long term filtering parameters to obtain four 5 ms long term filtering excitation signals, and the four 5 ms long term filtering excitation signals may be combined in a chronological order of the subframes to obtain one 20 ms long term filtering excitation signal.

In one embodiment, after obtaining the long term filtering excitation signal, the terminal splits the obtained long term filtering excitation signal into a plurality of subframes to obtain a plurality of sub-long term filtering excitation signals, performs linear synthesis filtering respectively on each sub-long term filtering excitation signal based on the corresponding linear filtering parameters to obtain a sub-linear filtering excitation signal corresponding to each subframe, and then combines the sub-linear filtering excitation signals corresponding to the subframes each in a chronological order of the subframes to obtain the corresponding linear filtering excitation signal.

For example, when a speech packet corresponds to a 20 ms audio signal, that is, the obtained long term filtering excitation signal has a frame length of 20 ms, the long term filtering excitation signal may be split into two subframes to obtain two 10 ms sub-long term filtering excitation signals, linear synthesis filtering may be performed on each 10 ms sub-long term filtering excitation signal respectively based on the corresponding linear filtering parameters to obtain two 10 ms sub-audio signals, and then the two 10 ms sub-audio signals may be combined in a chronological order of the subframes to obtain one 20 ms audio signal.

S304: Extract, when the audio signal is a feedforward error correction frame signal, feature parameters from the audio signal.

The audio signal is a feedforward error correction frame signal means that an audio signal of the historical adjacent frame of the audio signal has anomalies. The audio signal of the historical adjacent frame having anomalies specifically includes: the speech packet corresponding to the audio signal of the historical adjacent frame is not received, or the received speech packet corresponding to the audio signal of the historical adjacent frame is not decoded normally. The feature parameters include a cepstrum feature parameter.

In one embodiment, after decoding and filtering the received speech packet to obtain the audio signal, the terminal determines whether a historical speech packet decoded before the speech packet is decoded has data anomalies, and determines, when the decoded historical speech packet has data anomalies, the current audio signal obtained after the decoding and the filtering is the feedforward error correction frame signal.

Specifically, the terminal determines whether a historical audio signal corresponding to the historical speech packet decoded at the previous moment before the speech packet is decoded is a previous frame audio signal of the audio signal obtained by decoding the speech packet, and if so, determines that the historical speech packet has no data anomalies, and if not, determines that the historical speech packet has data anomalies.

In this embodiment, the terminal determines whether the current audio signal obtained by decoding and filtering is the feedforward error correction frame signal by determining whether the historical speech packet decoded before the current speech packet is decoded has data anomalies, and thereby can, if the audio signal is the feedforward error correction frame signal, enhance the audio signal to further improve the quality of the audio signal.

In one embodiment, when the audio signal obtained by decoding is the feedforward error correction frame signal, feature parameters are extracted from the audio signal obtained by decoding. The feature parameters extracted may specifically be a cepstrum feature parameter. This process specifically includes the following steps: performing Fourier transform on the audio signal to obtain a Fourier-transformed audio signal; performing logarithm processing on the Fourier-transformed audio signal to obtain a logarithm result; and performing inverse Fourier transform on the obtained logarithm result to obtain the cepstrum feature parameter. Specifically, the cepstrum feature parameter may be extracted from the audio signal according to the following formula:

$$C(n) = \int_{-\frac{1}{2}}^{\frac{1}{2}} \log|S(F)| e^{j2\pi Fn} dF \tag{6}$$

C(n) is the cepstrum feature parameter of the audio signal S(n) obtained by decoding and filtering, and S(F) is the Fourier-transformed audio signal obtained by performing Fourier transform on the audio signal S(n).

In the above embodiment, the terminal can extract the cepstrum feature parameter from the audio signal, and thereby enhance the audio signal based on the extracted cepstrum feature parameter, and improve the quality of the audio signal.

In one embodiment, when the audio signal is not a feedforward error correction frame signal, that is, when the previous frame audio signal of the current audio signal obtained by decoding and filtering has no anomalies, the feature parameters may also be extracted from the current audio signal obtained by decoding and filtering, so that the current audio signal obtained by decoding and filtering can be enhanced.

S306: Convert the audio signal into a filter speech excitation signal based on the linear filtering parameters.

Specifically, after decoding and filtering the speech packet to obtain the audio signal, the terminal may further acquire the linear filtering parameters obtained when decoding the speech packet, and perform linear analysis filtering on the obtained audio signal based on the linear filtering parameters, thereby converting the audio signal into the filter speech excitation signal.

In an embodiment, S306 specifically includes the following steps: configuring parameters of linear predictive coding filters based on the linear filtering parameters, and performing linear decomposition filtering on the audio signal by the parameter-configured linear predictive coding filters to obtain the filter speech excitation signal.

The linear decomposition filtering is also called linear analysis filtering. In the embodiment of this application, in the process of performing linear analysis filtering on the audio signal, the linear analysis filtering is performed on the audio signal of the whole frame, and there is no need to split the audio signal of the whole frame into subframes.

Specifically, the terminal may perform linear decomposition filtering on the audio signal to obtain the filter speech excitation signal according to the following formula:

$$D(n) = S(n) + \sum_{i=1}^{p} A_i S_{adj}(n-i) \tag{7}$$

D(n) is the filter speech excitation signal corresponding to the audio signal S(n) obtained after decoding and filtering the speech packet, S(n) is the audio signal obtained after decoding and filtering the speech packet, $S_{adj}$(n–i) is the energy-adjusted state of the previous frame audio signal S(n–i) of the obtained audio signal S(n), p is the number of sampling points included in each frame audio signal, and $A_i$ is the linear filtering coefficient obtained by decoding the speech packet.

In the above embodiment, the terminal converts the audio signal into the filter speech excitation signal based on the linear filtering parameters, and thereby can enhance the filter speech excitation signal to enhance the audio signal, and improve the quality of the audio signal.

S308: Perform speech enhancement on the filter speech excitation signal according to the feature parameters, the long term filtering parameters and the linear filtering parameters to obtain an enhanced speech excitation signal.

The long term filtering parameters include a pitch period and a magnitude gain value.

In one embodiment, S308 includes the following steps: performing speech enhancement on the filter speech excitation signal according to the pitch period, the amplitude gain value, the linear filtering parameters and the cepstrum feature parameter to obtain the enhanced speech excitation signal.

Specifically, the speech enhancement of the audio signal may specifically be realized by a pre-trained signal enhancement model. The signal enhancement model is a neural network (NN) model which may specifically adopt LSTM and CNN structures.

In the above embodiment, the terminal performs speech enhancement on the filter speech excitation signal according to the pitch period, the magnitude gain value, the linear filtering parameters and the cepstrum feature parameter to obtain the enhanced speech excitation signal, and thereby can enhance the audio signal based on the enhanced speech excitation signal, and improve the quality of the audio signal.

In one embodiment, the terminal inputs the feature parameters, the long term filtering parameters, the linear filtering parameters and the filter speech excitation signal into the pre-trained signal enhancement model, so that the signal enhancement model performs speech enhancement on the filter speech excitation signal based on the feature parameters to obtain the enhanced speech excitation signal.

In the above embodiment, the terminal obtains the enhanced speech excitation signal by the pre-trained signal enhancement model, and thereby can enhance the audio signal based on the enhanced speech excitation signal, and improve the quality of the audio signal and the efficiency of audio signal enhancement.

In the embodiment of this application, in the process of performing speech enhancement on the filter speech excitation signal by the pre-trained signal enhancement model, the speech enhancement is performed on the filter speech excitation signal of the whole frame, and there is no need to split the filter speech excitation signal of the whole frame into subframes.

S310: Perform speech synthesis based on the enhanced speech excitation signal and the linear filtering parameters to obtain an enhanced speech signal.

The speech synthesis may be linear synthesis filtering based on the linear filtering parameters.

In one embodiment, after obtaining the enhanced speech excitation signal, the terminal configure parameters of the linear predictive coding filters based on the linear filtering parameters, and performs linear synthesis filtering on the enhanced speech excitation signal by the parameter-configured linear predictive coding filters to obtain the enhanced speech signal.

The linear filtering parameters include a linear filtering coefficient and an energy gain value. The linear filtering coefficient may be denoted as LPC AR, and the energy gain value may be denoted as LPC gain. The linear synthesis filtering is an inverse process of the linear analysis filtering performed at the sending end when encoding the audio signal. Therefore, the linear predictive coding filter that performs the linear synthesis filtering is also called a linear inverse filter. The time domain of the linear predictive coding filter is expressed as follows:

$$S_{enh}(n) = D_{enh}(n) - \sum_{i=1}^{p} A_i S_{adj}(n-i) \tag{8}$$

$S_{enh}$(n) is the enhanced speech signal, $D_{enh}$(n) is the enhanced speech excitation signal obtained after performing speech enhancement on the filter speech excitation signal D(n), $S_{adj}$(n–i) is the energy-adjusted state of the previous frame audio signal S(n–i) of the obtained audio signal S(n), p is the number of sampling points included in each frame audio signal, and $A_i$ is the linear filtering coefficient obtained by decoding the speech packet.

The energy-adjusted state of the previous frame audio signal S(n–i) of the obtained audio signal S(n), $S_{adj}$(n–i), may be obtained by the following formula:

$$S_{adj}(n-i) = \text{gain}_{adj} g S(n-i) \tag{9}$$

In the formula above, $S_{adj}$(n–i) is the energy-adjusted state of the previous frame audio signal S(n–i), and $\text{gain}_{adj}$ is the energy adjustment parameter of the previous frame audio signal S(n–i).

In this embodiment, the terminal may obtain the enhanced speech signal by performing linear synthesis filtering on the enhanced speech excitation signal to enhance the audio signal, thereby improving the quality of the audio signal.

In the embodiment of this application, in the process of speech synthesis, the speech synthesis is performed on the enhanced speech excitation signal of the whole frame, and there is no need to split the enhanced speech excitation signal of the whole frame into subframes.

According to the above audio signal enhancement method, when receiving the speech packet, the terminal sequentially decodes and filters the speech packets to obtain the audio signal; extracts, in the case that the audio signal is the feedforward error correction frame signal, the feature parameters from the audio signal; converts the audio signal into the filter speech excitation signal based on the linear filtering coefficient obtained by decoding the speech packet; performs the speech enhancement on the filter speech excitation signal according to the feature parameters and the long term filtering parameters obtained by decoding the speech packet to obtain the enhanced speech excitation signal; and performs the speech synthesis based on the enhanced speech excitation signal and the linear filtering parameters to obtain the enhanced speech signal, to enhance the audio signal within a short time and achieve better signal enhancement effects, thereby improving the timeliness of audio signal enhancement.

Figure 6:
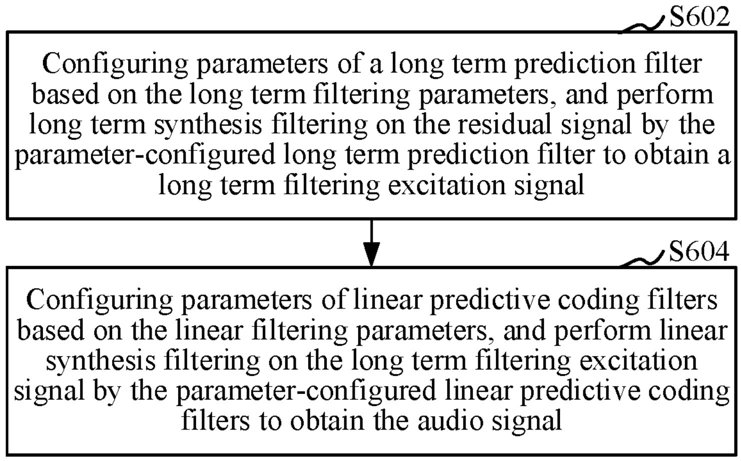
FIG. 6 is a flowchart of a speech packet decoding and filtering step according to one embodiment.

In one embodiment, as shown in FIG. 6, S302 specifically includes the following steps:

S602: Configure parameters of a long term prediction filter based on the long term filtering parameters, and perform long term synthesis filtering on the residual signal by the parameter-configured long term prediction filter to obtain a long term filtering excitation signal.

The long term filtering parameters include a pitch period and a corresponding magnitude gain value. The pitch period may be denoted as LTP pitch, and LTP pitch may also be called the pitch period. The corresponding magnitude gain value may be denoted as LTP gain. The long term synthesis filtering is performed on the residual signal by the parameter-configured long term prediction filter. The long term synthesis filtering is an inverse process of the long term analysis filtering performed at the sending end when encoding the audio signal. Therefore, the long term prediction filter that performs the long term analysis filtering is also called a long term inverse filter. That is, the long term inverse filter is used to process the residual signal. The frequency domain of the long term inverse filter corresponding to formula (1) is expressed as follows:

$$p^{-1}(z) = \frac{1}{1-\gamma z^{-T}} \tag{10}$$

Figure 7:
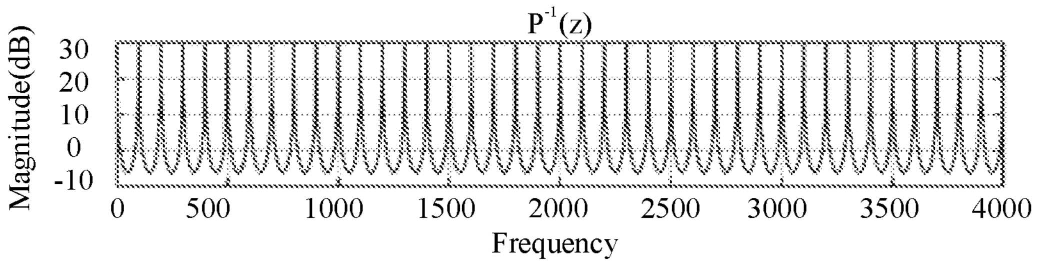
FIG. 7 is a magnitude-frequency response diagram of a long term inverse filter according to one embodiment.

$p^{-1}(z)$ is the magnitude-frequency response of the long term inverse filter, z is the twiddle factor of frequency domain transformation, $\gamma$ is the magnitude gain value LTP gain, and T is the pitch period LTP pitch. FIG. 7 shows a magnitude-frequency response diagram of a long term inverse prediction filter when $\gamma=1$ and T=80 according to one embodiment.

The time domain of the long term inverse filter corresponding to formula (10) is expressed as follows:

$$E(n)=\gamma E(n-T)+\delta(n) \tag{11}$$

In the formula above, E(n) is the long term filtering excitation signal corresponding to the speech packet, $\delta(n)$ is the residual signal corresponding to the speech packet, $\gamma$ is the magnitude gain value LTP gain, T is the pitch period LTP pitch, and E(n−T) is the long term filtering excitation signal corresponding to the audio signal of the previous pitch period of the speech packet. It can be understood that in this embodiment, the long term filtering excitation signal E(n) obtained at the receiving end by performing long term synthesis filtering on the residual signal by the long term inverse filter is the same as the linear filtering excitation signal e(n) obtained by performing linear analysis filtering on the audio signal by the linear filter during the encoding at the sending end.

S604: Configure parameters of linear predictive coding filters based on the linear filtering parameters, and perform linear synthesis filtering on the long term filtering excitation signal by the parameter-configured linear predictive coding filters to obtain the audio signal.

The linear filtering parameters include a linear filtering coefficient and an energy gain value. The linear filtering coefficient may be denoted as LPC AR, and the energy gain value may be denoted as LPC gain. The linear synthesis filtering is an inverse process of the linear analysis filtering performed at the sending end when encoding the audio signal. Therefore, the linear predictive coding filter that performs the linear synthesis filtering is also called a linear inverse filter. The time domain of the linear predictive coding filter is expressed as follows:

$$S(n) = E(n) - \sum_{i=1}^{p} A_i S_{adj}(n-i) \tag{12}$$

In the formula above, S(n) is the audio signal corresponding to the speech packet, E(n) is the long term filtering excitation signal corresponding to the speech packet, $S_{adj}(n-i)$ is the energy-adjusted state of the previous frame audio signal S(n−i) of the obtained audio signal S(n), p is the number of sampling points included in each frame audio signal, and $A_i$ is the linear filtering coefficient obtained by decoding the speech packet.

The energy-adjusted state of the previous frame audio signal S(n−i) of the obtained audio signal S(n), $S_{adj}(n-i)$, may be obtained by the following formula:

$$S_{adj}(n-i) = \text{gain}_{adj} gS(n-i) = \frac{\text{gain}(n-i)}{\text{gain}(n)} gS(n-i) \tag{13}$$

$\text{gain}_{adj}$ is the energy adjustment parameter of the previous frame audio signal S(n−i), gain(n) is the energy gain value obtained by decoding the speech packet, and gain(n−i) is the energy gain value corresponding to the previous frame audio signal.

In the above embodiment, the terminal performs the long term synthesis filtering on the residual signal based on the long term filtering parameters to obtain the long term filtering excitation signal; and performs the linear synthesis filtering on the long term filtering excitation signal based on the linear filtering parameters obtained by decoding to obtain the audio signal, and thereby can directly output the audio signal when the audio signal is not the feedforward error correction frame signal, and enhance the audio signal and output the enhanced speech signal when the audio signal is the feedforward error correction frame signal, and improve the timeliness (reduce latency) of audio signal outputting.

In one embodiment, S604 specifically includes the following steps: splitting the long term filtering excitation signal into at least two subframes to obtain sub-long term filtering excitation signals; grouping the linear filtering parameters obtained by decoding to obtain at least two linear filtering parameter sets; configuring parameters of the at least two linear predictive coding filters respectively based on the linear filtering parameter sets; inputting the obtained sub-long term filtering excitation signals respectively into the parameter-configured linear predictive coding filters such that the linear predictive coding filters perform linear synthesis filtering on the sub-long term filtering excitation signals based on the linear filtering parameter sets to obtain sub-audio signals corresponding to the subframes each; and combining the sub-audio signals in a chronological order of the subframes to obtain the audio signal.

There are two types of linear filtering parameter sets: a linear filtering coefficient set and an energy gain value set.

Specifically, when linear synthesis filtering is performed on the sub-long term filtering excitation signal corresponding to each subframe by the linear inverse filter corresponding to formula (12), in formula (12), S(n) is the sub-audio signal corresponding to any subframe, E(n) is the long term filtering excitation signal corresponding to the subframe, $S_{adj}(n-i)$ is the energy-adjusted state of the previous subframe sub-audio signal S(n of the obtained sub-audio signal S(n), p is the number of sampling points included in each subframe audio signal, and $A_i$ is the linear filtering coefficient set corresponding to the subframe. In formula (13), $gain_{adj}$ is the energy-adjusted state of the previous subframe sub-audio signal of the sub-audio signal, gain(n) is the energy gain value of the sub-audio signal, and gain(n−i) is the energy gain value of the previous subframe sub-audio signal of the sub-audio signal.

In the above embodiment, the terminal splits the long term filtering excitation signal into the at least two subframes to obtain the sub-long term filtering excitation signals; groups the linear filtering parameters obtained by decoding to obtain the at least two linear filtering parameter sets; configures parameters of the at least two linear predictive coding filters respectively based on the linear filtering parameter sets; inputs the obtained sub-long term filtering excitation signals respectively into the parameter-configured linear predictive coding filters such that the linear predictive coding filters perform the linear synthesis filtering on the sub-long term filtering excitation signals based on the linear filtering parameter sets to obtain sub-audio signals corresponding to the subframes each; and combines the sub-audio signals in the chronological order of the subframes to obtain the audio signal, thereby ensuring the obtained audio signal to be a good reproduction of the audio signal sent by the sending end and improve the quality of the reproduced audio signal.

In one embodiment, the linear filtering parameters include a linear filtering coefficient and an energy gain value. S604 further includes the following steps: acquiring, for the sub-long term filtering excitation signal corresponding to a first subframe in the long term filtering excitation signal, the energy gain value of a historical sub-long term filtering excitation signal of the subframe in a historical long term filtering excitation signal adjacent to the sub-long term filtering excitation signal corresponding to the first subframe; determining an energy adjustment parameter corresponding to the sub-long term filtering excitation signal based on the energy gain value corresponding to the historical sub-long term filtering excitation signal and the energy gain value of the sub-long term filtering excitation signal corresponding to the first subframe; and performing energy adjustment on the historical sub-long term filtering excitation signal based on the energy adjustment parameter to obtain the energy-adjusted historical sub-long term filtering excitation signal.

The historical long term filtering excitation signal is the previous frame long term filtering excitation signal of the current frame long term filtering excitation signal, and the historical sub-long term filtering excitation signal of the subframe in the historical long term filtering excitation signal adjacent to the sub-long term filtering excitation signal corresponding to the first subframe is the sub-long term filtering excitation signal corresponding to the last subframe of the previous frame long term filtering excitation signal.

For example, when the current frame long term filtering excitation signal is split into two subframes to obtain a sub-long term filtering excitation signal corresponding to the first subframe and a sub-long term filtering excitation signal corresponding to the second subframe, the sub-long term filtering excitation signal corresponding to the second subframe of the previous frame long term filtering excitation signal and the sub-long term filtering excitation signal corresponding to the first subframe of the current frame are adjacent subframes.

In one embodiment, after obtaining the energy-adjusted historical sub-long term filtering excitation signal, the terminal inputs the obtained sub-long term filtering excitation signal and the energy-adjusted historical sub-long term filtering excitation signal into the parameter-configured linear predictive coding filter, so that the linear predictive coding filter performs linear synthesis filtering on the sub-long term filtering excitation signal corresponding to the first subframe based on the linear filtering coefficient and the energy-adjusted historical sub-long term filtering excitation signal to obtain the sub-audio signal corresponding to the first subframe.

For example, when a speech packet corresponds to a 20 ms audio signal, that is, the obtained long term filtering excitation signal has a frame length of 20 ms, the AR coefficient obtained by decoding the speech packet is and the energy gain value obtained by decoding the speech packet is $\{gain_1(n), gain_2(n)\}$, the long term filtering excitation signal may be split into two subframes to obtain a first sub-filtering excitation signal $E_1(n)$ corresponding to the first 10 ms and a second sub-filtering excitation signal $E_2(n)$ corresponding to the last 10 ms. The AR coefficients are grouped to obtain an AR coefficient set 1 and an AR coefficient set 2 $\{A_{p+1}, \ldots A_{2p-1}, A_{2p}\}$. The energy gain values are grouped to obtain an energy gain value set 1 and an energy gain value set 2 $\{gain_2(n)\}$. Then, the previous subframe sub-filtering excitation signal of the first sub-filtering excitation signal $E_1(n)$ is $E_2(n-i)$, the energy gain value set of the previous subframe of the first sub-filtering excitation signal $E_1(n)$ is $\{gain_2(n-i)\}$, the previous subframe sub-filtering excitation signal of the second sub-filtering excitation signal $E_2(n)$ is $E_1(n)$, and the energy gain value set of the previous subframe of the second sub-filtering excitation signal $E_2(n)$ is $\{gain_1(n)\}$. In this case, the sub-audio signal corresponding to the first sub-filtering excitation signal $E_1(n)$ may be calculated by substituting the corresponding parameters into formula (12) and formula (13), and the sub-audio signal corresponding to the second sub-filtering excitation signal $E_2(n)$ may be calculated by substituting the corresponding parameters into formula (12) and formula (13).

In the above embodiment, the terminal acquires, for the sub-long term filtering excitation signal corresponding to the first subframe in the long term filtering excitation signal, the energy gain value of the historical sub-long term filtering excitation signal of the subframe in the historical long term filtering excitation signal adjacent to the sub-long term filtering excitation signal corresponding to the first subframe; determines the energy adjustment parameter corresponding to the sub-long term filtering excitation signal based on the energy gain value corresponding to the historical sub-long term filtering excitation signal and the energy gain value of the sub-long term filtering excitation signal corresponding to the first subframe; and performs the energy adjustment on the historical sub-long term filtering excitation signal based on the energy adjustment parameter, inputs the obtained sub-long term filtering excitation signal and the energy-adjusted historical sub-long term filtering excitation signal into the parameter-configured linear predictive coding filter, so that the linear predictive coding filter performs the linear synthesis filtering on the sub-long term filtering excitation signal corresponding to the first subframe based on the linear filtering coefficient and the energy-adjusted historical sub-long term filtering excitation signal to obtain the sub-audio signal corresponding to the first subframe, thereby ensuring the obtained each subframe audio signal to be a good reproduction of each subframe audio signal sent by the sending end and improve the quality of the reproduced audio signal.

In one embodiment, the feature parameters include a cepstrum feature parameter. S308 includes the following steps: vectorizing the cepstrum feature parameter, the long term filtering parameters and the linear filtering parameters, and concatenating the vectorization results to obtain a feature vector; inputting the feature vector and the filter speech excitation signal into the pre-trained signal enhancement model; performing feature extraction on the feature vector by the signal enhancement model to obtain a target feature vector; and enhancing the filter speech excitation signal based on the target feature vector to obtain the enhanced speech excitation signal.

The signal enhancement model is a multi-level network structure, specifically including a feature concatenation layer, a second feature concatenation layer, a first neural network layer and a second neural network layer. The target feature vector is an enhanced feature vector.

Specifically, Specifically, the terminal vectorizes the cepstrum feature parameter, the long term filtering parameters and the linear filtering parameters by the first feature concatenation layer of the signal enhancement model, and concatenates the vectorization results to obtain the feature vector; then inputs the obtained feature vector into the first neural network layer of the signal enhancement model; performs feature extraction on the feature vector by the first neural network layer to obtain a primary feature vector; inputs the primary feature vector and envelope information obtained by performing Fourier transform on the linear filtering coefficient in the linear filtering parameters into the second feature concatenation layer of the signal enhancement model; inputs the concatenated primary feature vector into the second neural network layer of the signal enhancement model; performs feature extraction on the concatenated primary feature vector by the second neural network layer to obtain the target feature vector; and enhances the filter speech excitation signal based on the target feature vector to obtain the enhanced speech excitation signal.

In the above embodiment, the terminal vectorizes the cepstrum feature parameter, the long term filtering parameters and the linear filtering parameters, and concatenates the vectorization results to obtain the feature vector; inputs the feature vector and the filter speech excitation signal into the pre-trained signal enhancement model; performs the feature extraction on the feature vector by the signal enhancement model to obtain the target feature vector; and enhances the filter speech excitation signal based on the target feature vector to obtain the enhanced speech excitation signal, and thereby can enhance the audio signal by the signal enhancement model, and improve the quality of the audio signal and the efficiency of audio signal enhancement.

In one embodiment, the terminal enhancing the filter speech excitation signal based on the target feature vector to obtain the enhanced speech excitation signal includes: performing Fourier transform on the filter speech excitation signal to obtain a frequency domain speech excitation signal; enhancing the magnitude feature of the frequency domain speech excitation signal based on the target feature vector; and performing inverse Fourier transform on the frequency domain speech excitation signal with the enhanced magnitude feature to obtain the enhanced speech excitation signal.

Specifically, the terminal performs Fourier transform on the filter speech excitation signal to obtain the frequency domain speech excitation signal; enhances the magnitude feature of the frequency domain speech excitation signal based on the target feature vector; and performs, in combination with phase features of the non-enhanced frequency domain speech excitation signal, inverse Fourier transform on the frequency domain speech excitation signal with the enhanced magnitude feature to obtain the enhanced speech excitation signal.

Figure 8:
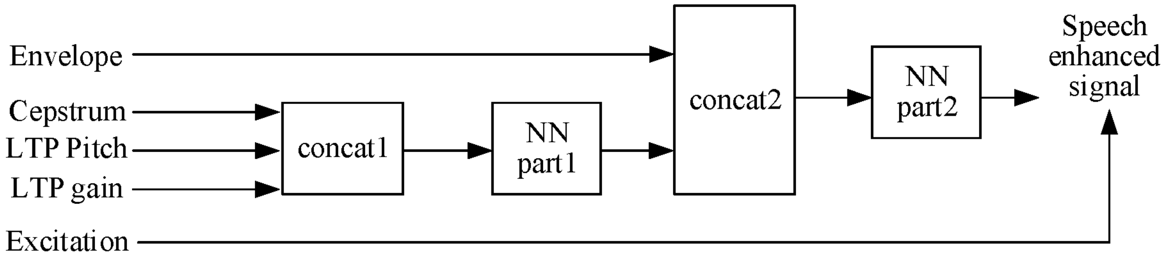
FIG. 8 is a schematic diagram of a signal enhancement model according to one embodiment.

As shown in FIG. 8, the two feature concatenation layers are respectively concat1 and concat2, and the two neural network layers are respectively NN part1 and NN part2. The cepstrum feature parameter Cepstrum with a dimensionality of 40, the pitch period LTP pitch with a dimensionality of 1 and the magnitude gain value LTP Gain with a dimensionality of 1 are concatenated together by concat1 to form a feature vector with a dimensionality of 42, and the feature vector with a dimensionality of 42 is inputted into NN part1.NN part1 is composed of a two-layer convolutional neural network and two fully connected networks. The first-layer convolution kernel has a dimensionality of (1, 128, 3, 1), and the second-layer convolution kernel has a dimensionality of (128, 128, 3, 1). The fully connected networks respectively have 128 and 8 nodes. The activation function at the end of each layer is Tan h function. High-level features are extracted from the feature vector by NN part1 to obtain the primary feature vector with a dimensionality of 1024, the primary feature vector with a dimensionality of 1024 and the envelope information Envelope with a dimensionality of 161 obtained by performing Fourier transform on the linear filtering coefficient LPC AR in the linear filtering parameter are concatenated by concat2 to obtain a concatenated primary feature vector with a dimensionality of 1185, and the concatenated primary feature vector with a dimensionality of 1185 is inputted into NN part2.NN part2 is a two-layer fully connected network, the two layers respectively have 256 and 161 nodes, and the activation function at the end of each layer is Tan h function. The target feature vector is obtained at the NN part2, then the magnitude feature Excitation of the frequency domain speech excitation signal obtained by performing Fourier transform on the filter speech excitation signal is enhanced based on the target feature vector, and inverse Fourier transform is performed on the filter speech excitation signal with the enhanced magnitude feature Excitation to obtain the enhanced speech excitation signal $D_{enh}(n)$.

In the above embodiment, the terminal performs the Fourier transform on the filter speech excitation signal to obtain the frequency domain speech excitation signal; enhances the magnitude feature of the frequency domain speech excitation signal based on the target feature vector; and performs the inverse Fourier transform on the frequency domain speech excitation signal with the enhanced magnitude feature to obtain the enhanced speech excitation signal, and thereby can enhance the audio signal on the premise of keeping phase information of the audio signal unchanged, and improve the quality of the audio signal.

In one embodiment, the linear filtering parameters include a linear filtering coefficient and an energy gain value. The terminal the configuring parameters of the linear predictive coding filters based on the linear filtering parameters, and performing the linear synthesis filtering on the enhanced speech excitation signal by the parameter-configured linear predictive coding filters includes: configuring parameters of the linear predictive coding filter based on the linear filtering coefficient; acquiring the energy gain value corresponding to the historical speech packet decoded prior to decoding the speech packet; determining the energy adjustment parameter based on the energy gain value corresponding to the historical speech packet and the energy gain value corresponding to the speech packet; performing energy adjustment on the historical long term filtering excitation signal corresponding to the historical speech packet based on the energy adjustment parameter to obtain the adjusted historical long term filtering excitation signal; and inputting the adjusted historical long term filtering excitation signal and the enhanced speech excitation signal into the parameter-configured linear predictive coding filters such that the linear predictive coding filters perform linear synthesis filtering on the enhanced speech excitation signal based on the adjusted historical long term filtering excitation signal.

The historical audio signal corresponding to the historical speech packet is the previous frame audio signal of the current frame audio signal corresponding to the current speech packet. The energy gain value corresponding to the historical speech packet may be the energy gain value corresponding to the whole frame audio signal of the historical speech, or the energy gain value corresponding to a subframe audio signal of the historical speech packet.

Specifically, when the audio signal is not a feedforward error correction frame signal, that is, when the previous frame audio signal of the current frame audio signal is obtained by normally decoding the historical speech packet by the terminal, then the energy gain value of the historical speech packet obtained when the terminal decodes the historical speech packet can be acquired, and the energy adjustment parameter can be determined based on the energy gain value of the historical speech packet. When the audio signal is a forward error correction frame signal, that is, when the previous frame audio signal of the current frame audio signal is not obtained by normally decoding the historical speech packet by the terminal, then a compensation energy gain value corresponding to the previous frame audio signal is determined based on a preset energy gain compensation mechanism, and the compensation energy gain value is determined as the energy gain value of the historical speech packet, so that the energy adjustment parameter is determined based on the energy gain value of the historical speech packet.

In one embodiment, when the audio signal is not the feedforward error correction frame signal, the energy adjustment parameter $gain_{adj}$ of the previous frame audio signal S(n−i) may be obtained by the following formula:

$$gain_{adj} = \frac{gain(n-i)}{gain(n)} \tag{14}$$

$gain_{adj}$ is the energy adjustment parameter of the previous frame audio signal S(n−i), gain(n−i) is the energy gain value of the previous frame audio signal S(n−i), and gain(n) is the energy gain value of the current frame audio signal. Formula (14) is used to calculate the energy adjustment parameter based on the energy gain value corresponding to the whole frame audio signal of the historical speech.

In one embodiment, when the audio signal is not the feedforward error correction frame signal, the energy adjustment parameter $gain_{adj}$ of the previous frame audio signal S(n−i) may be obtained by the following formula:

$$gain_{adj} = \frac{gain_m(n-i)}{\{gain_1(n) + \ldots + gain(n)\}/m} \tag{15}$$

$gain_{adj}$ is the energy adjustment parameter of the previous frame audio signal S(n−i), $gain_m$(n−i) is the energy gain value of the $m^{th}$ subframe of the previous frame audio signal S(n−i), $gain_m$(n) is the energy gain value of the $m^{th}$ subframe of the current frame audio signal, m is the number of subframes corresponding to each audio signal, and {$gain_1$(n)+ . . . +gain(n)}/m is the energy gain value of the current frame audio signal. Formula (15) is used to calculate the energy adjustment parameter based on the energy gain value corresponding to the sub-frame audio signal of the historical speech.

In the above embodiment, the terminal configures parameters of the linear predictive coding filter based on the linear filtering coefficient; acquires the energy gain value corresponding to the historical speech packet decoded before the speech packet is decoded; determines the energy adjustment parameter based on the energy gain value corresponding to the historical speech packet and the energy gain value corresponding to the speech packet; performs the energy adjustment on the historical long term filtering excitation signal corresponding to the historical speech packet based on the energy adjustment parameter to obtain the adjusted historical long term filtering excitation signal; and inputs the adjusted historical long term filtering excitation signal and the enhanced speech excitation signal into the parameter-configured linear predictive coding filters such that the linear predictive coding filters perform the linear synthesis filtering on the enhanced speech excitation signal based on the adjusted historical long term filtering excitation signal, such that the audio signals of different frames can be smoothed, thereby improving the quality of the speech formed by the audio signals of different frames.

Figure 9:
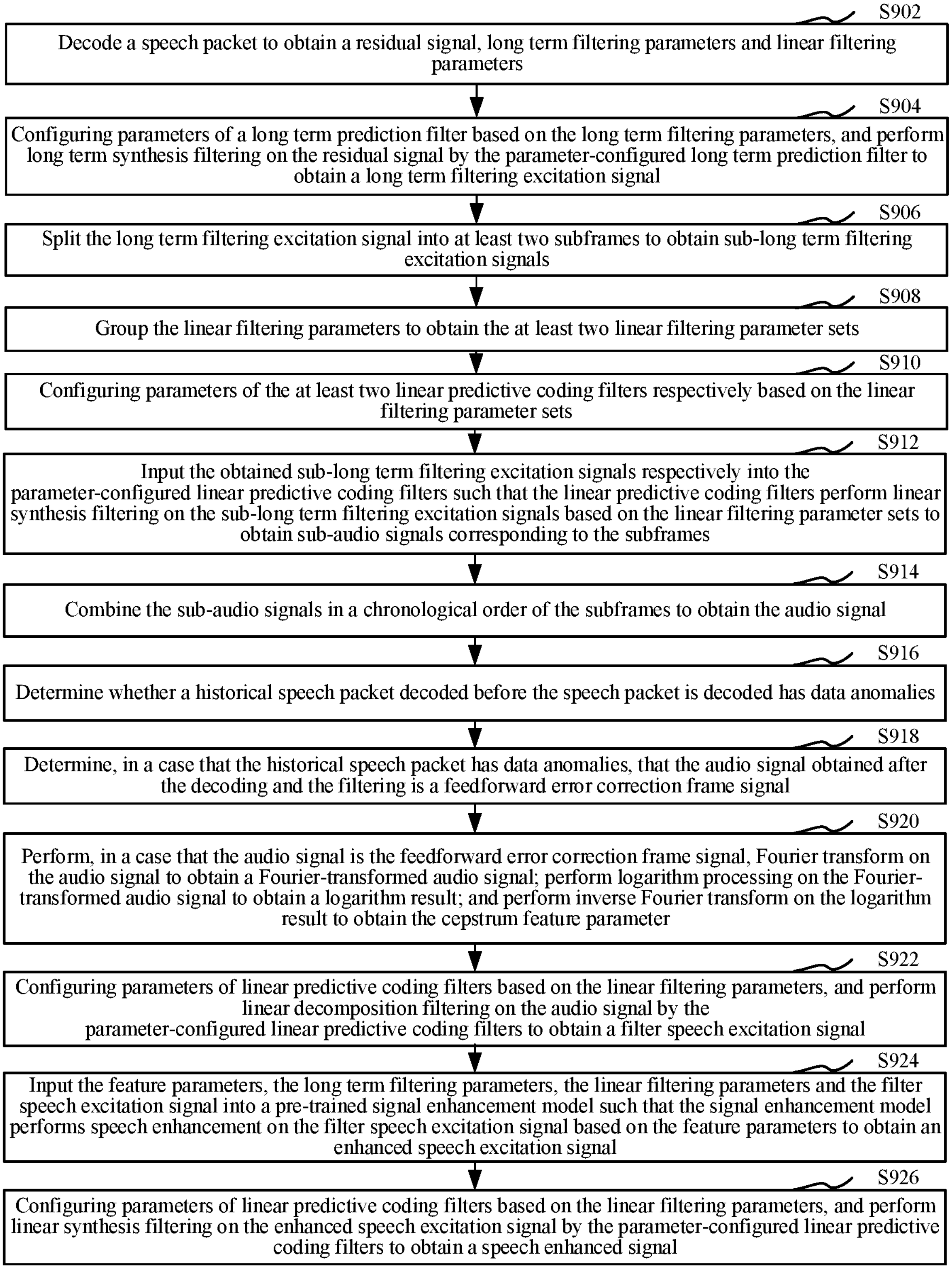
FIG. 9 is a flowchart of an audio signal enhancement method according to another embodiment.

In an embodiment, as shown in FIG. 9, an audio signal enhancement method is provided. The method is applied to the computer device (terminal or server) shown in FIG. 2 is used as an example for description. The method includes the following step:

S902: Decode a speech packet to obtain a residual signal, long term filtering parameters and linear filtering parameters.

S904: Configure parameters of a long term prediction filter based on the long term filtering parameters, and perform long term synthesis filtering on the residual signal by the parameter-configured long term prediction filter to obtain a long term filtering excitation signal.

S906: Split the long term filtering excitation signal into at least two subframes to obtain sub-long term filtering excitation signals.

S908: Group the linear filtering parameters to obtain the at least two linear filtering parameter sets.

S910: Configure parameters of the at least two linear predictive coding filters respectively based on the linear filtering parameter sets.

S912: Input the obtained sub-long term filtering excitation signals respectively into the parameter-configured linear predictive coding filters such that the linear predictive coding filters perform linear synthesis filtering on the sub-long term filtering excitation signals based on the linear filtering parameter sets to obtain sub-audio signals corresponding to the subframes each.

S914: Combine the sub-audio signals in a chronological order of the subframes to obtain the audio signal.

S916: Determine whether a historical speech packet decoded before the speech packet is decoded has data anomalies.

S918: Determine, when the historical speech packet has data anomalies, that the audio signal obtained after the decoding and the filtering is a feedforward error correction frame signal.

S920: Perform, when the audio signal is the feedforward error correction frame signal, Fourier transform on the audio signal to obtain a Fourier-transformed audio signal; perform logarithm processing on the Fourier-transformed audio signal to obtain a logarithm result; and perform inverse Fourier transform on the logarithm result to obtain the cepstrum feature parameter.

S922: Configure parameters of linear predictive coding filters based on the linear filtering parameters, and perform linear decomposition filtering on the audio signal by the parameter-configured linear predictive coding filters to obtain a filter speech excitation signal.

S924: Input the feature parameters, the long term filtering parameters, the linear filtering parameters and the filter speech excitation signal into a pre-trained signal enhancement model such that the signal enhancement model performs speech enhancement on the filter speech excitation signal based on the feature parameters to obtain an enhanced speech excitation signal.

S926: Configure parameters of linear predictive coding filters based on the linear filtering parameters, and perform linear synthesis filtering on the enhanced speech excitation signal by the parameter-configured linear predictive coding filters to obtain an enhanced speech signal.

Figure 10:
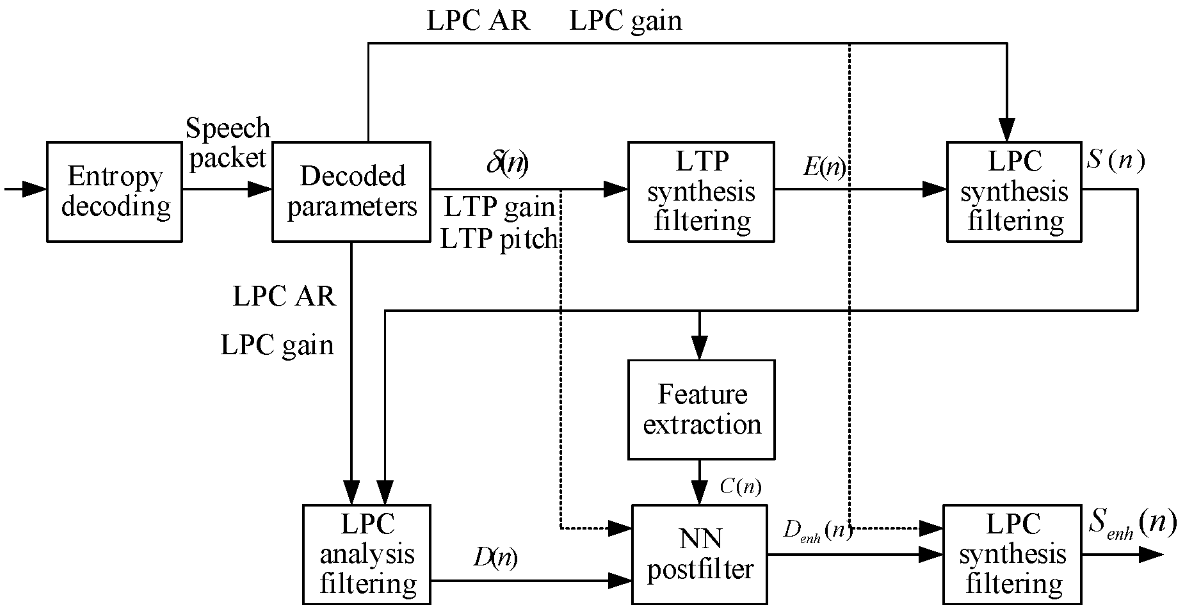
FIG. 10 is a flowchart of an audio signal enhancement method according to another embodiment.

This application further provides an application scenario, and the above audio signal enhancement method is applied to the application scenario. Specifically, the audio signal enhancement method is applied to the application scenario as follows:

Taking a Fs=16000 Hz broadband signal as an example, it can be understood that this application is also applicable to scenarios with other sampling rates, such as Fs=8000 Hz, 32000 Hz or 48000 Hz. The frame length of the audio signal is set to 20 ms. For Fs=16000 Hz, it is equivalent to each frame containing 320 sample points. With reference to FIG. 10, after receiving a speech packet corresponding to one frame of audio signal, the terminal performs entropy decoding on the speech packet to obtain δ(n), LTP pitch, LTP gain, LPC AR and LPC gain; performs LTP synthesis filtering on δ(n) based on LTP pitch and LTP gain to obtain E(n); performs LPC synthesis filtering respectively on each subframe of E(n) based on LPC AR and LPC gain; combines the LPC synthesis filtering results to obtain one frame S(n); performs cepstrum analysis on S(n) to obtain C(n); performs LPC decomposition filtering on the whole frame S(n) based on LPC AR and LPC gain to obtain a whole frame D(n); inputs envelope information obtained by performing Fourier transform on LTP pitch, LTP gain and LPC AR, C(n) and D(n) into a pre-trained signal enhancement model NN postfilter; enhances the whole frame D(n) by NN postfilter to obtain a whole frame $D_{enh}(n)$; and performs LPC synthesis filtering on the whole frame $D_{enh}(n)$ based on LPC AR and LPC gain to obtain $S_{enh}(n)$.

It should be understood that steps in flowcharts of FIG. 3, FIG. 4, FIG. 6, FIG. 9 and FIG. 10 are displayed in sequence based on indication of arrows, but the steps are not necessarily performed in sequence based on a sequence indicated by the arrows. Unless otherwise explicitly specified in this specification, execution of the steps is not strictly limited, and the steps may be performed in other sequences. In addition, at least some steps in FIG. 3, FIG. 4, FIG. 6, FIG. 9, and FIG. 10 may include a plurality of steps or a plurality of stages, and these steps or stages are not necessarily performed at a same time instant, but may be performed at different time instants. The steps or stages are not necessarily performed in sequence, but may be performed by turn or alternately with other steps or at least part of steps or stages in other steps.

Figure 11:
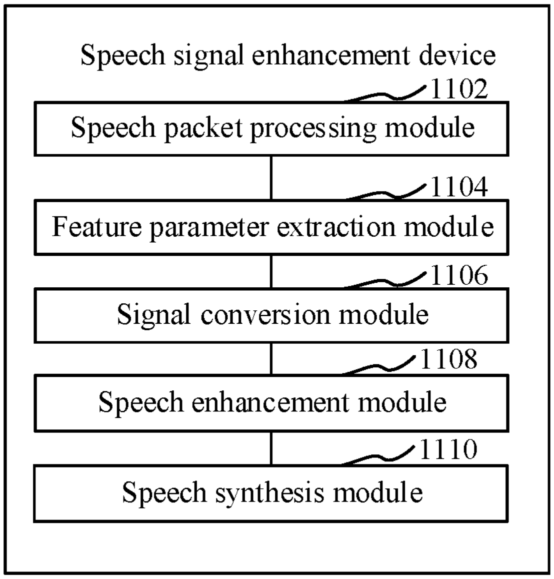
FIG. 11 is a block diagram of an audio signal enhancement apparatus according to one embodiment.

In an embodiment, as shown in FIG. 11, an audio signal enhancement apparatus is provided. The apparatus may use software modules or hardware modules, or become a part of a computer device by a combination of the two. The apparatus specifically includes: a speech packet processing module 1102, a feature parameter extraction module 1104, a signal conversion module 1106, a speech enhancement module 1108 and a speech synthesis module 1110.

The speech packet processing module 1102 is configured to decode and filter received speech packets sequentially to obtain a residual signal, long term filtering parameters and linear filtering parameters; and filter the residual signal to obtain an audio signal.

The feature parameter extraction module 1104 is configured to extract, when the audio signal is a feedforward error correction frame signal, feature parameters from the audio signal.

The signal conversion module 1106 is configured to convert the audio signal into a filter speech excitation signal based on the linear filtering parameters.

The speech enhancement module 1108 is configured to perform speech enhancement on the filter speech excitation signal according to the feature parameters, the long term filtering parameters and the linear filtering parameters to obtain an enhanced speech excitation signal.

The speech synthesis module 1110 is configured to perform speech synthesis based on the enhanced speech excitation signal and the linear filtering parameters to obtain an enhanced speech signal.

In the above embodiment, the computer device sequentially decodes the received speech packets to obtain the residual signal, the long term filtering parameters and the linear filtering parameters; filters the residual signal to obtain the audio signal; extracts, in the case that the audio signal is the feedforward error correction frame signal, the feature parameters from the audio signal; converts the audio signal into the filter speech excitation signal based on the linear filtering coefficient obtained by decoding the speech packet; performs the speech enhancement on the filter speech excitation signal according to the feature parameters and the long term filtering parameters obtained by decoding the speech packet to obtain the enhanced speech excitation signal; and performs the speech synthesis based on the enhanced speech excitation signal and the linear filtering parameters to obtain the enhanced speech signal, to enhance the audio signal within a short time and achieve better signal enhancement effects, thereby improving the timeliness of audio signal enhancement.

In one embodiment, the speech packet processing module 1102 is further configured to: configure parameters of a long term prediction filter based on the long term filtering parameters, and perform long term synthesis filtering on the residual signal by the parameter-configured long term prediction filter to obtain a long term filtering excitation signal; and configure parameters of linear predictive coding filters based on the linear filtering parameters, and perform linear synthesis filtering on the long term filtering excitation signal by the parameter-configured linear predictive coding filters to obtain the audio signal.

In the above embodiment, the terminal performs the long term synthesis filtering on the residual signal based on the long term filtering parameters to obtain the long term filtering excitation signal; and performs the linear synthesis filtering on the long term filtering excitation signal based on the linear filtering parameters obtained by decoding to obtain the audio signal, and thereby can directly output the audio signal when the audio signal is not the feedforward error correction frame signal, and enhance the audio signal and output the enhanced speech signal when the audio signal is the feedforward error correction frame signal, and improve the timeliness of audio signal outputting.

In one embodiment, the speech packet processing module 1102 is further configured to: split the long term filtering excitation signal into at least two subframes to obtain sub-long term filtering excitation signals; group the linear filtering parameters to obtain at least two linear filtering parameter sets; configure parameters of the at least two linear predictive coding filters respectively based on the linear filtering parameter sets; input the obtained sub-long term filtering excitation signals respectively into the parameter-configured linear predictive coding filters such that the linear predictive coding filters perform linear synthesis filtering on the sub-long term filtering excitation signals based on the linear filtering parameter sets to obtain sub-audio signals corresponding to the subframes each; and combine the sub-audio signals in a chronological order of the subframes to obtain the audio signal.

In the above embodiment, the terminal splits the long term filtering excitation signal into the at least two subframes to obtain the sub-long term filtering excitation signals; groups the linear filtering parameters to obtain the at least two linear filtering parameter sets; configures parameters of the at least two linear predictive coding filters respectively based on the linear filtering parameter sets; inputs the obtained sub-long term filtering excitation signals respectively into the parameter-configured linear predictive coding filters such that the linear predictive coding filters perform linear synthesis filtering on the sub-long term filtering excitation signals based on the linear filtering parameter sets to obtain sub-audio signals corresponding to the subframes each; and combines the sub-audio signals in the chronological order of the subframes to obtain the audio signal, thereby ensuring the obtained audio signal to be a good reproduction of the audio signal sent by the sending end and improve the quality of the reproduced audio signal.

In one embodiment, the linear filtering parameters include a linear filtering coefficient and an energy gain value. The speech packet processing module 1102 is further configured to: acquire, for the sub-long term filtering excitation signal corresponding to a first subframe in the long term filtering excitation signal, the energy gain value corresponding to a historical sub-long term filtering excitation signal of the subframe in a historical long term filtering excitation signal adjacent to the sub-long term filtering excitation signal corresponding to the first subframe; determine an energy adjustment parameter corresponding to the sub-long term filtering excitation signal based on the energy gain value corresponding to the historical sub-long term filtering excitation signal and the energy gain value of the sub-long term filtering excitation signal corresponding to the first subframe; perform energy adjustment on the historical sub-long term filtering excitation signal based on the energy adjustment parameter; and input the obtained sub-long term filtering excitation signal and the energy-adjusted historical sub-long term filtering excitation signal obtained into the parameter-configured linear predictive coding filter such that the linear predictive coding filter performs linear synthesis filtering on the sub-long term filtering excitation signal corresponding to the first subframe based on the linear filtering coefficient and the energy-adjusted historical sub-long term filtering excitation signal to obtain the sub-audio signal corresponding to the first subframe.

In the above embodiment, the terminal acquires, for the sub-long term filtering excitation signal corresponding to the first subframe in the long term filtering excitation signal, the energy gain value of the historical sub-long term filtering excitation signal of the subframe in the historical long term filtering excitation signal adjacent to the sub-long term filtering excitation signal corresponding to the first subframe; determines the energy adjustment parameter corresponding to the sub-long term filtering excitation signal based on the energy gain value corresponding to the historical sub-long term filtering excitation signal and the energy gain value of the sub-long term filtering excitation signal corresponding to the first subframe; and performs the energy adjustment on the historical sub-long term filtering excitation signal based on the energy adjustment parameter, inputs the obtained sub-long term filtering excitation signal and the energy-adjusted historical sub-long term filtering excitation signal into the parameter-configured linear predictive coding filter, so that the linear predictive coding filter performs the linear synthesis filtering on the sub-long term filtering excitation signal corresponding to the first subframe based on the linear filtering coefficient and the energy-adjusted historical sub-long term filtering excitation signal to obtain the sub-audio signal corresponding to the first subframe, thereby ensuring the obtained each subframe audio signal to be a good reproduction of each subframe audio signal sent by the sending end and improve the quality of the reproduced audio signal.

Figure 12:
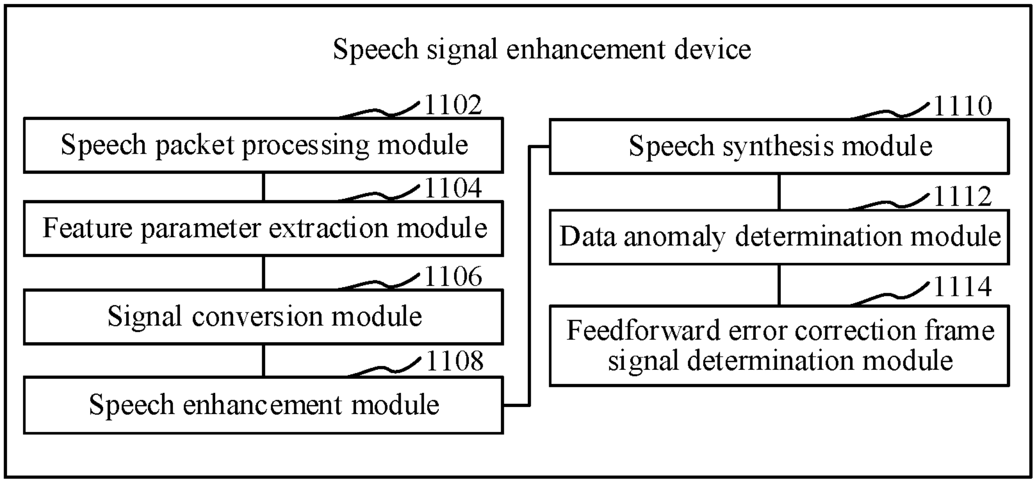
FIG. 12 is a block diagram of an audio signal enhancement apparatus according to another embodiment.

In an embodiment, as shown in FIG. 12, the apparatus further includes: a data anomaly determination module 1112 and a feedforward error correction frame signal determination module 1114. The data anomaly determination module 1112 is configured to determine whether a historical speech packet decoded before the speech packet is decoded has data anomalies. The feedforward error correction frame signal determination module 1114 is configured to determine, when the historical speech packet has data anomalies, the audio signal obtained after the decoding and the filtering is the feedforward error correction frame signal.

In the above embodiment, the terminal determines whether the current audio signal obtained by decoding and filtering is the feedforward error correction frame signal by determining whether the historical speech packet decoded before the current speech packet is decoded has data anomalies, and thereby can, if the audio signal is the feedforward error correction frame signal, enhance the audio signal to further improve the quality of the audio signal.

In one embodiment, the feature parameters include a cepstrum feature parameter. The feature parameter extraction module 1104 is further configured to: perform Fourier transform on the audio signal to obtain a Fourier-transformed audio signal; perform logarithm processing on the Fourier-transformed audio signal to obtain a logarithm result; and perform inverse Fourier transform on the logarithm result to obtain the cepstrum feature parameter.

In the above embodiment, the terminal can extract the cepstrum feature parameter from the audio signal, and thereby enhance the audio signal based on the extracted cepstrum feature parameter, and improve the quality of the audio signal.

In one embodiment, the long term filtering parameters include a pitch period and a magnitude gain value. The speech enhancement module 1108 is further configured to: perform speech enhancement on the filter speech excitation signal according to the pitch period, the amplitude gain value, the linear filtering parameters and the cepstrum feature parameter to obtain the enhanced speech excitation signal.

In the above embodiment, the terminal performs speech enhancement on the filter speech excitation signal according to the pitch period, the magnitude gain value, the linear filtering parameters and the cepstrum feature parameter to obtain the enhanced speech excitation signal, and thereby can enhance the audio signal based on the enhanced speech excitation signal, and improve the quality of the audio signal.

In one embodiment, the signal conversion module 1106 is further configured to: configure parameters of linear predictive coding filters based on the linear filtering parameters, and perform linear decomposition filtering on the audio signal by the parameter-configured linear predictive coding filters to obtain the filter speech excitation signal.

In the above embodiment, the terminal converts the audio signal into the filter speech excitation signal based on the linear filtering parameters, and thereby can enhance the filter speech excitation signal to enhance the audio signal, and improve the quality of the audio signal.

In one embodiment, the speech enhancement module 1108 is further configured to: input the feature parameters, the long term filtering parameters, the linear filtering parameters and the filter speech excitation signal into a pre-trained signal enhancement model such that the signal enhancement model performs the speech enhancement on the filter speech excitation signal based on the feature parameters to obtain the enhanced speech excitation signal.

In the above embodiment, the terminal obtains the enhanced speech excitation signal by the pre-trained signal enhancement model, and thereby can enhance the audio signal based on the enhanced speech excitation signal, and improve the quality of the audio signal and the efficiency of audio signal enhancement.

In one embodiment, the feature parameters include a cepstrum feature parameter. The speech enhancement module 1108 is further configured to: vectorize the cepstrum feature parameter, the long term filtering parameters and the linear filtering parameters, and concatenate the vectorization results to obtain a feature vector; input the feature vector and the filter speech excitation signal into the pre-trained signal enhancement model; perform feature extraction on the feature vector by the signal enhancement model to obtain a target feature vector; and enhance the filter speech excitation signal based on the target feature vector to obtain the enhanced speech excitation signal.

In the above embodiment, the terminal vectorizes the cepstrum feature parameter, the long term filtering parameters and the linear filtering parameters, and concatenates the vectorization results to obtain the feature vector; inputs the feature vector and the filter speech excitation signal into the pre-trained signal enhancement model; performs the feature extraction on the feature vector by the signal enhancement model to obtain the target feature vector; and enhances the filter speech excitation signal based on the target feature vector to obtain the enhanced speech excitation signal, and thereby can enhance the audio signal by the signal enhancement model, and improve the quality of the audio signal and the efficiency of audio signal enhancement.

In one embodiment, the speech enhancement module 1108 is further configured to: perform Fourier transform on the filter speech excitation signal to obtain a frequency domain speech excitation signal; enhance a magnitude feature of the frequency domain speech excitation signal based on the target feature vector; and perform inverse Fourier transform on the frequency domain speech excitation signal with the enhanced magnitude feature to obtain the enhanced speech excitation signal.

In the above embodiment, the terminal performs the Fourier transform on the filter speech excitation signal to obtain the frequency domain speech excitation signal; enhances the magnitude feature of the frequency domain speech excitation signal based on the target feature vector; and performs the inverse Fourier transform on the frequency domain speech excitation signal with the enhanced magnitude feature to obtain the enhanced speech excitation signal, and thereby can enhance the audio signal on the premise of keeping phase information of the audio signal unchanged, and improve the quality of the audio signal.

In one embodiment, the speech synthesis module 1110 is further configured to: configure parameters of linear predictive coding filters based on the linear filtering parameters, and perform linear synthesis filtering on the enhanced speech excitation signal by the parameter-configured linear predictive coding filters to obtain the enhanced speech signal.

In this embodiment, the terminal may obtain the enhanced speech signal by performing linear synthesis filtering on the enhanced speech excitation signal to enhance the audio signal, thereby improving the quality of the audio signal.

In one embodiment, the linear filtering parameters include a linear filtering coefficient and an energy gain value. The speech synthesis module 1110 is further configured to: configure parameters of the linear predictive coding filter based on the linear filtering coefficient; acquire an energy gain value corresponding to a historical speech packet decoded before the speech packet is decoded; determine an energy adjustment parameter based on the energy gain value corresponding to the historical speech packet and the energy gain value corresponding to the speech packet; perform energy adjustment on a historical long term filtering excitation signal corresponding to the historical speech packet based on the energy adjustment parameter to obtain an adjusted historical long term filtering excitation signal; and input the adjusted historical long term filtering excitation signal and the enhanced speech excitation signal into the parameter-configured linear predictive coding filters such that the linear predictive coding filters perform linear synthesis filtering on the enhanced speech excitation signal based on the adjusted historical long term filtering excitation signal.

In the above embodiment, the terminal configures parameters of the linear predictive coding filter based on the linear filtering coefficient; acquires the energy gain value corresponding to the historical speech packet decoded before the speech packet is decoded; determines the energy adjustment parameter based on the energy gain value corresponding to the historical speech packet and the energy gain value corresponding to the speech packet; performs the energy adjustment on the historical long term filtering excitation signal corresponding to the historical speech packet based on the energy adjustment parameter to obtain the adjusted historical long term filtering excitation signal; and inputs the adjusted historical long term filtering excitation signal and the enhanced speech excitation signal into the parameter-configured linear predictive coding filters such that the linear predictive coding filters perform the linear synthesis filtering on the enhanced speech excitation signal based on the adjusted historical long term filtering excitation signal, such that the audio signals of different frames can be smoothed, thereby improving the quality of the speech formed by the audio signals of different frames.

For a specific limitation on the audio signal enhancement apparatus, refer to the limitation on the audio signal enhancement method above. Details are not described herein again. The modules in the foregoing audio signal enhancement apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 13. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store speech packet data. The network interface of the computer device is configured to communicate with an external terminal through a network connection. The computer program is executed by the processor to implement an audio signal enhancement method.

In an embodiment, a computer device is provided. The computer device may be a terminal, and an internal structure diagram thereof may be shown in FIG. 14. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or a wireless manner, and the wireless manner can be implemented by using WIFI, an operator network, NFC, or other technologies. The computer program is executed by the processor to implement an audio signal enhancement method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 13:
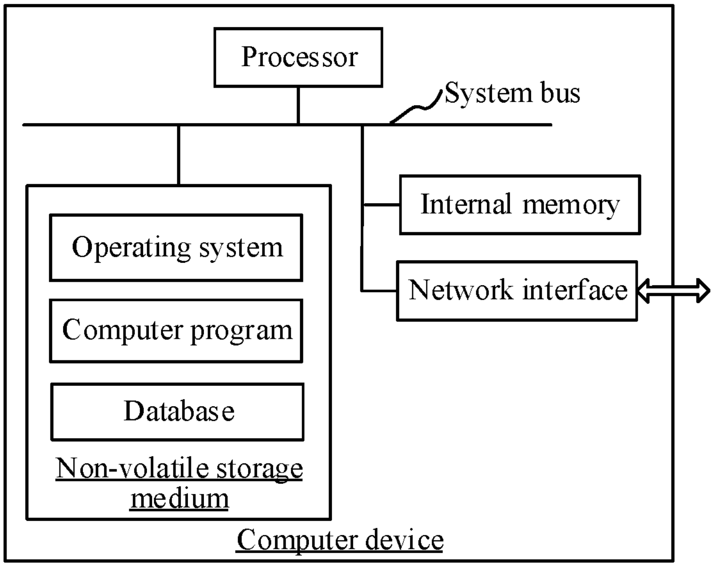
FIG. 13 is an internal structure diagram of a computer device according to an embodiment.
Figure 14:
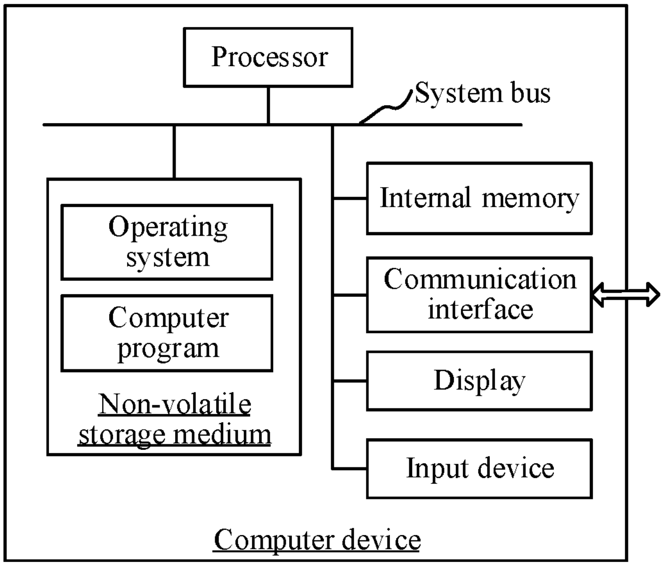
FIG. 14 is a diagram of an internal structure of a computer device according to another embodiment.

A person skilled in the art may understand that the structure shown in FIG. 13 or 14 is only a block diagram of a part of a structure related to a solution of this application and does not limit the computer device to which the solution of this application is applied. Specifically, the computer device may include more or fewer components than those in the drawings, or some components are combined, or a different component deployment is used.

In an embodiment, a computer device is further provided, including a memory and a processor, the memory storing a computer program, when executed by the processor, causing the processor to perform the steps in the foregoing method embodiments.

In an embodiment, a computer-readable storage medium is provided, storing a computer program, the computer program, when executed by a processor, implementing the steps in the foregoing method embodiments.

In an embodiment, a computer program product or a computer program is provided. The computer program product or the computer program includes computer instructions, the computer instructions being stored in a computer-readable storage medium. The processor of the computer device reads the computer instructions from the computer-readable storage medium, and the processor executes the computer instructions, to cause the computer device to perform the steps in the above method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be combined in different manners to form other embodiments. For concise description, not all possible combinations of the technical features in the embodiment are described. However, provided that combinations of the technical features do not conflict with each other, the combinations of the technical features are considered as falling within the scope recorded in this specification.

The foregoing embodiments only describe several implementations of this application specifically and in detail, but cannot be construed as a limitation to the patent scope of this application. A person of ordinary skill in the art may make various changes and improvements without departing from the ideas of this application, which shall all fall within the protection scope of this application. Therefore, the protection scope of this patent application is subject to the protection scope of the appended claims.

What is claimed is:

1. An audio signal enhancement method, performed by a computer device, the method comprising:

decoding received speech packets sequentially to obtain a residual signal, long term filtering parameters and linear filtering parameters;

filtering the residual signal to obtain an audio signal;

extracting a feature parameter from the audio signal, when the audio signal is a feedforward error correction frame signal;

converting the audio signal into a filter speech excitation signal based on the linear filtering parameters;

performing speech enhancement on the filter speech excitation signal according to the feature parameter, the long term filtering parameters and the linear filtering parameters to obtain an enhanced speech excitation signal, comprising:

vectorizing the feature parameter, the long term filtering parameters and the linear filtering parameters, and concatenating the vectorization results to obtain a feature vector;

inputting the feature vector and the filter speech excitation signal into a pre-trained signal enhancement model;

performing feature extraction on the feature vector by the pre-trained signal enhancement model to obtain a target feature vector; and enhancing the filter speech excitation signal based on the target feature vector to obtain the enhanced speech excitation signal; and performing speech synthesis to obtain an enhanced speech signal based on the enhanced speech excitation signal and the linear filtering parameters.

2. The method according to claim 1, wherein the filtering the residual signal to obtain the audio signal comprises:

configuring parameters of a long term prediction filter based on the long term filtering parameters, and performing long term synthesis filtering on the residual signal by the parameter-configured long term prediction filter to obtain a long term filtering excitation signal; and configuring parameters of linear predictive coding filters based on the linear filtering parameters, and performing linear synthesis filtering on the long term filtering excitation signal by the parameter-configured linear predictive coding filters to obtain the audio signal.

3. The method according to claim 2, wherein the configuring parameters of the linear predictive coding filters based on the linear filtering parameters, and performing the linear synthesis filtering on the long term filtering excitation signal by the parameter-configured linear predictive coding filters to obtain the audio signal comprises:

splitting the long term filtering excitation signal into at least two subframes to obtain sub-long term filtering excitation signals;

grouping the linear filtering parameters to obtain at least two linear filtering parameter sets;

configuring parameters of the at least two linear predictive coding filters respectively based on the linear filtering parameter sets;

inputting the obtained sub-long term filtering excitation signals respectively into the parameter-configured linear predictive coding filters, performing the linear synthesis filtering, by the linear predictive coding filters, on the sub-long term filtering excitation signals based on the linear filtering parameter sets to obtain sub-audio signals corresponding to each of the subframes; and combining the sub-audio signals in a chronological order of the subframes to obtain the audio signal.

4. The method according to claim 3, wherein the linear filtering parameters comprise a linear filtering coefficient and an energy gain value, the method further comprises:

acquiring, for the sub-long term filtering excitation signal corresponding to a first subframe in the long term filtering excitation signal, the energy gain value of a historical sub-long term filtering excitation signal of a subframe in a historical long term filtering excitation signal adjacent to the sub-long term filtering excitation signal corresponding to the first subframe;

determining an energy adjustment parameter corresponding to the sub-long term filtering excitation signal based on the energy gain value corresponding to the historical sub-long term filtering excitation signal and the energy gain value of the sub-long term filtering excitation signal corresponding to the first subframe;

performing energy adjustment on the historical sub-long term filtering excitation signal based on the energy adjustment parameter; and the inputting the obtained sub-long term filtering excitation signals respectively into the parameter-configured linear predictive coding filters, and the performing the linear synthesis filtering, by the linear predictive coding filters, on the sub-long term filtering excitation signals based on the linear filtering parameter sets to obtain the sub-audio signals corresponding to each of the subframes comprises:

inputting the obtained sub-long term filtering excitation signal and the energy-adjusted historical sub-long term filtering excitation signal obtained into the parameter-configured linear predictive coding filter;

performing the linear synthesis filtering on the sub-long term filtering excitation signal corresponding to the first subframe based on the linear filtering coefficient and the energy-adjusted historical sub-long term filtering excitation signal to obtain the sub-audio signal corresponding to the first subframe.

5. The method according to claim 1, wherein the method further comprises:

determining whether a historical speech packet decoded prior to decoding the received speech packets has data anomalies; and determining, when the historical speech packet has data anomalies, that the audio signal obtained after the filtering of the residual signal is the feedforward error correction frame signal.

6. The method according to claim 1, wherein the feature parameter comprises a cepstrum feature parameter, and the extracting the feature parameter from the audio signal comprises:

performing Fourier transform on the audio signal to obtain a Fourier-transformed audio signal;

performing logarithm processing on the Fourier-transformed audio signal to obtain a logarithm result; and performing inverse Fourier transform on the logarithm result to obtain the cepstrum feature parameter.

7. The method according to claim 6, wherein the long term filtering parameters comprise a pitch period and a magnitude gain value; and the performing the speech enhancement on the filter speech excitation signal according to the feature parameter, the long term filtering parameters and the linear filtering parameters to obtain the enhanced speech excitation signal comprises:

performing speech enhancement on the filter speech excitation signal according to the pitch period, the magnitude gain value, the linear filtering parameters and the cepstrum feature parameter to obtain the enhanced speech excitation signal.

8. The method according to claim 1, wherein the converting the audio signal into the filter speech excitation signal based on the linear filtering parameters comprises:

configuring parameters of linear predictive coding filters based on the linear filtering parameters, and performing linear decomposition filtering on the audio signal by the parameter-configured linear predictive coding filters to obtain the filter speech excitation signal.

9. The method according to claim 1, wherein the feature parameter comprises a cepstrum feature parameter.

10. The method according to claim 9, wherein the enhancing the filter speech excitation signal based on the target feature vector to obtain the enhanced speech excitation signal comprises:

performing Fourier transform on the filter speech excitation signal to obtain a frequency domain speech excitation signal;

enhancing a magnitude feature of the frequency domain speech excitation signal based on the target feature vector; and performing inverse Fourier transform on the frequency domain speech excitation signal with the enhanced magnitude feature to obtain the enhanced speech excitation signal.

11. The method according to claim 1, wherein the performing the speech synthesis based on the enhanced speech excitation signal and the linear filtering parameters to obtain the enhanced speech signal comprises:

configuring parameters of linear predictive coding filters based on the linear filtering parameters, and performing linear synthesis filtering on the enhanced speech excitation signal by the parameter-configured linear predictive coding filters to obtain the enhanced speech signal.

12. The method according to claim 11, wherein the linear filtering parameters comprise a linear filtering coefficient and an energy gain value; and the configuring parameters of the linear predictive coding filters based on the linear filtering parameters, and performing the linear synthesis filtering on the enhanced speech excitation signal by the parameter-configured linear predictive coding filters comprises:

the configuring parameters of the linear predictive coding filter based on the linear filtering coefficient;

acquiring an energy gain value corresponding to a historical speech packet decoded prior to decoding the speech packet;

determining an energy adjustment parameter based on the energy gain value corresponding to the historical speech packet and the energy gain value corresponding to the speech packet;

performing energy adjustment on a historical long term filtering excitation signal corresponding to the historical speech packet based on the energy adjustment parameter to obtain an adjusted historical long term filtering excitation signal; and inputting the adjusted historical long term filtering excitation signal and the enhanced speech excitation signal into the parameter-configured linear predictive coding filters, the linear predictive coding filters performing the linear synthesis filtering on the enhanced speech excitation signal based on the adjusted historical long term filtering excitation signal.

13. A computer device, comprising a memory and a processor, the memory storing a computer program, and the processor, when executing the computer program, implementing operations comprising:

decoding received speech packets sequentially to obtain a residual signal, long term filtering parameters and linear filtering parameters;

filtering the residual signal to obtain an audio signal;

extracting a feature parameter from the audio signal, when the audio signal is a feedforward error correction frame signal;

converting the audio signal into a filter speech excitation signal based on the linear filtering parameters;

performing speech enhancement on the filter speech excitation signal according to the feature parameter, the long term filtering parameters and the linear filtering parameters to obtain an enhanced speech excitation signal, comprising:

vectorizing the feature parameter, the long term filtering parameters and the linear filtering parameters, and concatenating the vectorization results to obtain a feature vector;

inputting the feature vector and the filter speech excitation signal into a pre-trained signal enhancement model;

performing feature extraction on the feature vector by the pre-trained signal enhancement model to obtain a target feature vector; and enhancing the filter speech excitation signal based on the target feature vector to obtain the enhanced speech excitation signal; and performing speech synthesis to obtain an enhanced speech signal based on the enhanced speech excitation signal and the linear filtering parameters.

14. The computer device according to claim 13, wherein the filtering the residual signal to obtain the audio signal comprises:

configuring parameters of a long term prediction filter based on the long term filtering parameters, and performing long term synthesis filtering on the residual signal by the parameter-configured long term prediction filter to obtain a long term filtering excitation signal; and configuring parameters of linear predictive coding filters based on the linear filtering parameters, and performing linear synthesis filtering on the long term filtering excitation signal by the parameter-configured linear predictive coding filters to obtain the audio signal.

15. The computer device according to claim 14, wherein the configuring parameters of the linear predictive coding filters based on the linear filtering parameters, and performing the linear synthesis filtering on the long term filtering excitation signal by the parameter-configured linear predictive coding filters to obtain the audio signal comprises:

splitting the long term filtering excitation signal into at least two subframes to obtain sub-long term filtering excitation signals;

grouping the linear filtering parameters to obtain at least two linear filtering parameter sets;

configuring parameters of the at least two linear predictive coding filters respectively based on the linear filtering parameter sets;

inputting the obtained sub-long term filtering excitation signals respectively into the parameter-configured linear predictive coding filters, performing the linear synthesis filtering, by the linear predictive coding filters, on the sub-long term filtering excitation signals based on the linear filtering parameter sets to obtain sub-audio signals corresponding to each of the subframes; and combining the sub-audio signals in a chronological order of the subframes to obtain the audio signal.

16. The computer device according to claim 15, wherein the linear filtering parameters comprise a linear filtering coefficient and an energy gain value, the operations implemented by the processor further comprises:

acquiring, for the sub-long term filtering excitation signal corresponding to a first subframe in the long term filtering excitation signal, the energy gain value of a historical sub-long term filtering excitation signal of a subframe in a historical long term filtering excitation signal adjacent to the sub-long term filtering excitation signal corresponding to the first subframe;

determining an energy adjustment parameter corresponding to the sub-long term filtering excitation signal based on the energy gain value corresponding to the historical sub-long term filtering excitation signal and the energy gain value of the sub-long term filtering excitation signal corresponding to the first subframe;

performing energy adjustment on the historical sub-long term filtering excitation signal based on the energy adjustment parameter; and the inputting the obtained sub-long term filtering excitation signals respectively into the parameter-configured linear predictive coding filters, and the performing the linear synthesis filtering, by the linear predictive coding filters, on the sub-long term filtering excitation signals based on the linear filtering parameter sets to obtain the sub-audio signals corresponding to each of the subframes comprises:

inputting the obtained sub-long term filtering excitation signal and the energy-adjusted historical sub-long term filtering excitation signal obtained into the parameter-configured linear predictive coding filter;

performing the linear synthesis filtering on the sub-long term filtering excitation signal corresponding to the first subframe based on the linear filtering coefficient and the energy-adjusted historical sub-long term filtering excitation signal to obtain the sub-audio signal corresponding to the first subframe.

17. A non-transitory computer-readable storage medium, storing a computer program, the computer program, when executed by a processor, causing the processor to implement:

decoding received speech packets sequentially to obtain a residual signal, long term filtering parameters and linear filtering parameters;

filtering the residual signal to obtain an audio signal;

extracting a feature parameter from the audio signal, when the audio signal is a feedforward error correction frame signal;

converting the audio signal into a filter speech excitation signal based on the linear filtering parameters;

performing speech enhancement on the filter speech excitation signal according to the feature parameter, the long term filtering parameters and the linear filtering parameters to obtain an enhanced speech excitation signal, comprising:

vectorizing the feature parameter, the long term filtering parameters and the linear filtering parameters, and concatenating the vectorization results to obtain a feature vector;

inputting the feature vector and the filter speech excitation signal into a pre-trained signal enhancement model;

performing feature extraction on the feature vector by the pre-trained signal enhancement model to obtain a target feature vector; and enhancing the filter speech excitation signal based on the target feature vector to obtain the enhanced speech excitation signal; and performing speech synthesis to obtain an enhanced speech signal based on the enhanced speech excitation signal and the linear filtering parameters.

18. The computer-readable storage medium according to claim 17, wherein the computer program further causes the processor to perform:

determining whether a historical speech packet decoded prior to decoding the received speech packets has data anomalies; and determining, when the historical speech packet has data anomalies, that the audio signal obtained after the filtering of the residual signal is the feedforward error correction frame signal.

19. The computer-readable storage medium according to claim 17, wherein the feature parameter comprises a cepstrum feature parameter, and the extracting the feature parameter from the audio signal comprises:

performing Fourier transform on the audio signal to obtain a Fourier-transformed audio signal;

performing logarithm processing on the Fourier-transformed audio signal to obtain a logarithm result; and performing inverse Fourier transform on the logarithm result to obtain the cepstrum feature parameter.

* * * * *